United States Patent
Rausch et al.

(10) Patent No.: US 9,569,263 B2
(45) Date of Patent: *Feb. 14, 2017

(54) TECHNIQUES FOR GENERATING INSTRUCTIONS TO CONTROL DATABASE PROCESSING

(71) Applicant: SAS Institute Inc., Cary, NC (US)

(72) Inventors: Nancy Rausch, Apex, NC (US); Mike Frost, Raleigh, NC (US); Adam Michael Ames, Holly Springs, NC (US); Scott Gidley, Cary, NC (US); Chris Watson, Wendell, NC (US)

(73) Assignee: SAS INSTITUTE INC., Cary, NC (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/643,747

(22) Filed: Mar. 10, 2015

(65) Prior Publication Data

US 2015/0301860 A1 Oct. 22, 2015

Related U.S. Application Data

(63) Continuation of application No. 14/643,692, filed on Mar. 10, 2015, now Pat. No. 9,223,619.

(60) Provisional application No. 62/115,836, filed on Feb. 13, 2015, provisional application No. 62/090,362, filed on Dec. 11, 2014, provisional application No. 61/951,520, filed on Mar. 11, 2014.

(51) Int. Cl.
*G06F 9/46* (2006.01)
*G06F 17/30* (2006.01)
*G06F 9/48* (2006.01)
*G06F 3/0484* (2013.01)

(52) U.S. Cl.
CPC ......... *G06F 9/4881* (2013.01); *G06F 3/04842* (2013.01); *G06F 9/4806* (2013.01); *G06F 17/30445* (2013.01); *G06F 17/30554* (2013.01)

(58) Field of Classification Search
None
See application file for complete search history.

(56) References Cited

U.S. PATENT DOCUMENTS

| 7,676,478 | B2 | 3/2010 | Rausch |
| 7,908,266 | B2 | 3/2011 | Zeringue et al. |
| 8,661,065 | B2 | 2/2014 | Rausch et al. |
| 8,726,177 | B2 | 5/2014 | Zeringue et al. |
| 9,239,854 | B2 | 1/2016 | Rausch et al. |
| 9,268,828 | B2 | 2/2016 | Rausch et al. |
| 2012/0324387 | A1 | 12/2012 | Rausch et al. |
| 2014/0280349 | A1 | 9/2014 | Rausch et al. |

*Primary Examiner* — Tammy Lee

(57) ABSTRACT

An apparatus includes a task selector to receive an indication of a database task to be performed, wherein the database task includes a set of subtasks; a source selector to receive an indication of a source device to perform the set of subtasks, and to retrieve from the source device an indication of a processing environment currently available within the source device that includes an identity and version level of a database routine of the source device; and an instruction generator to determine a set of languages able to be interpreted by the database routine based on the identity and version level, select a language of the set of languages in which to generate instructions for each subtask based on the processing environment, and generate and transmit the instructions to the source device.

30 Claims, 21 Drawing Sheets

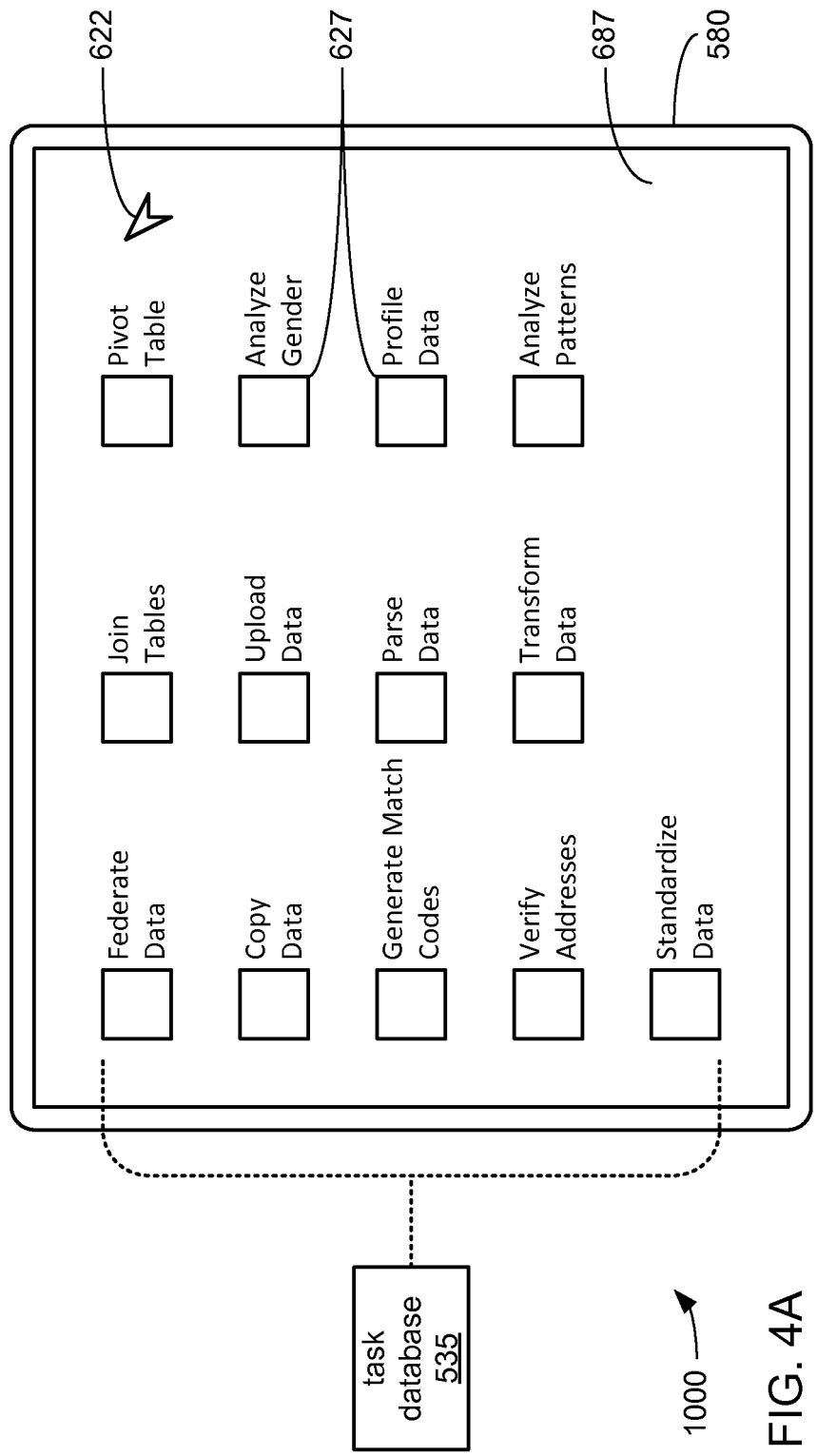

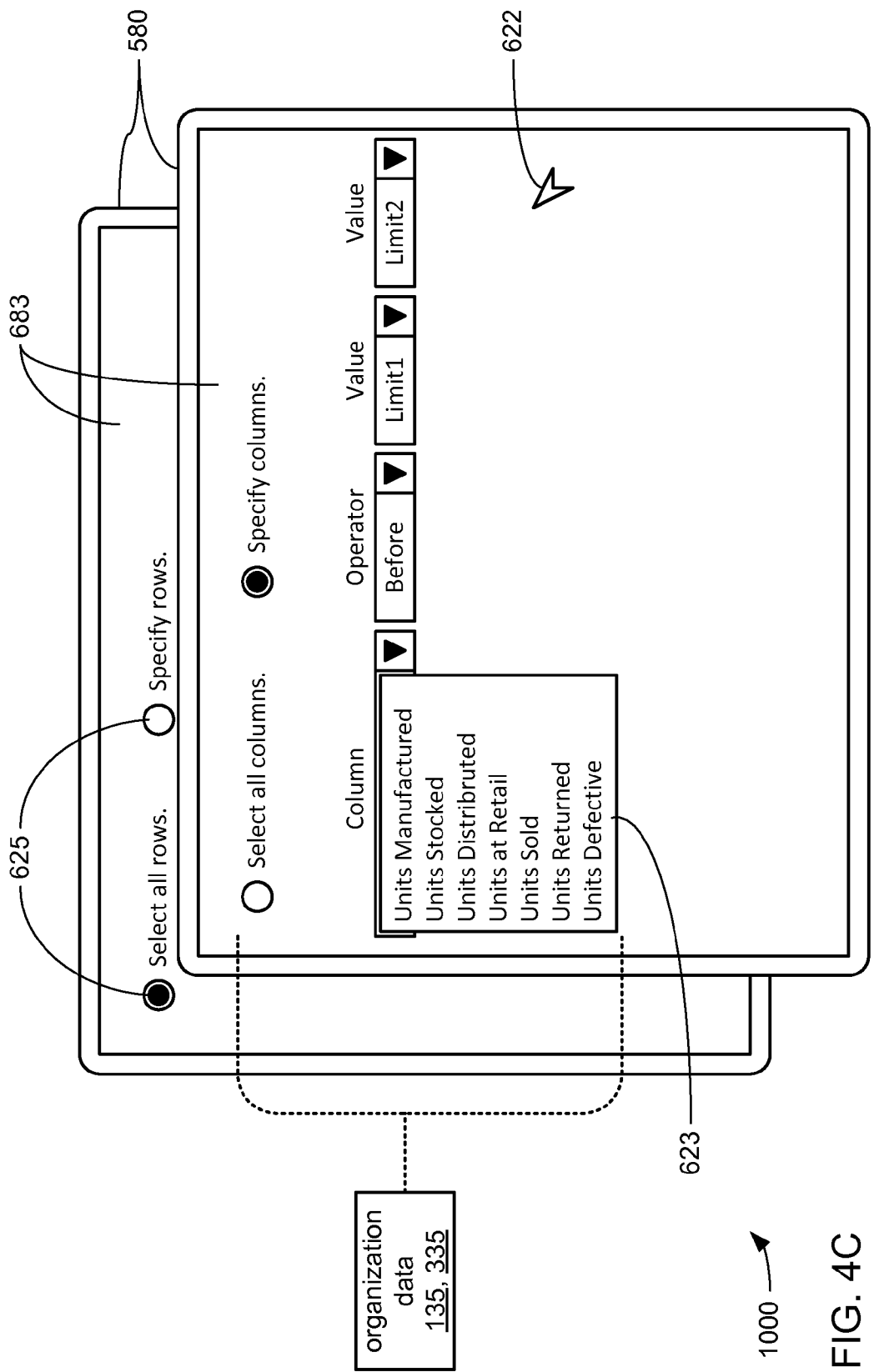

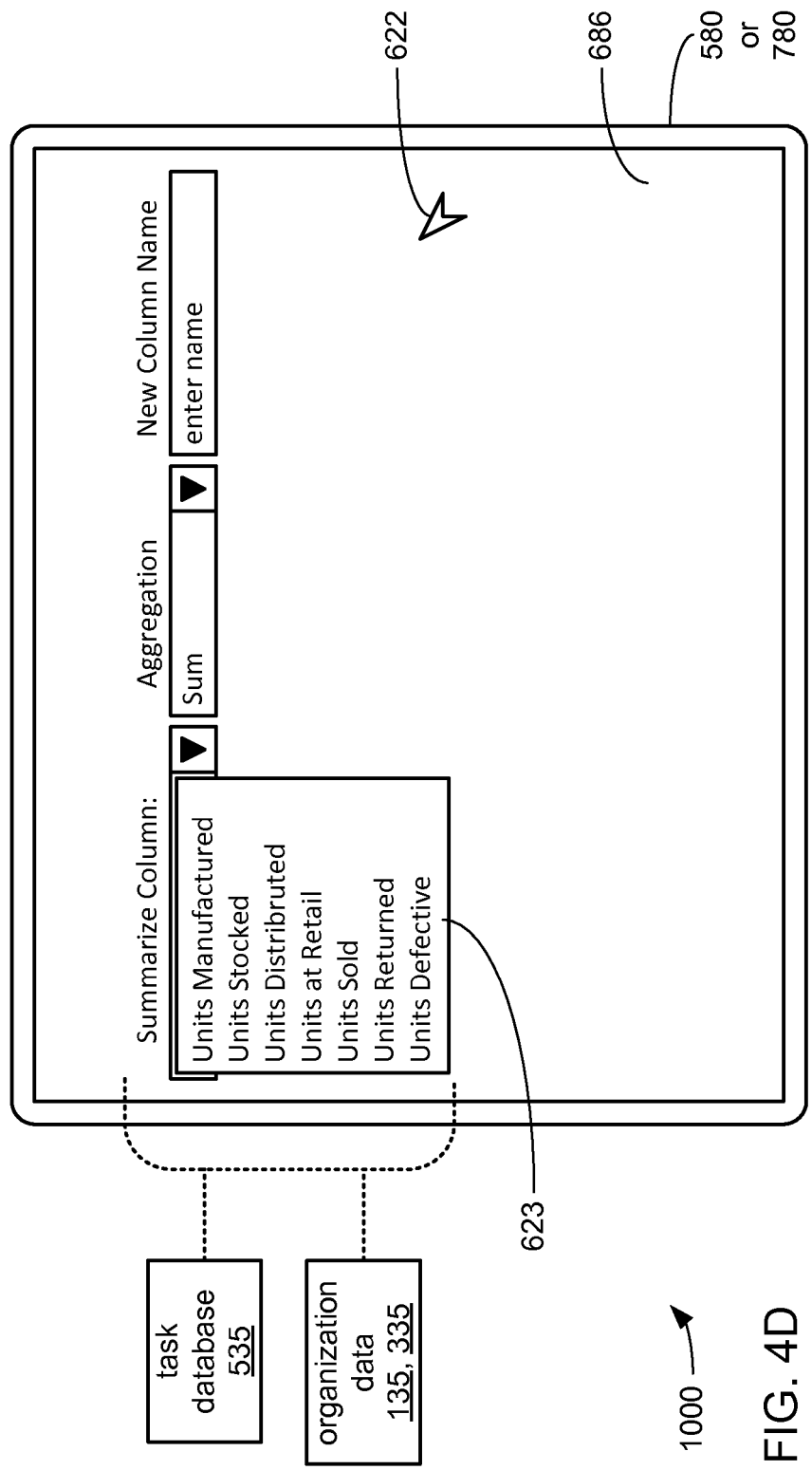

2400

TECHNIQUES FOR GENERATING INSTRUCTIONS TO CONTROL DATABASE PROCESSING

CROSS-REFERENCE TO RELATED APPLICATIONS

This application claims the benefit of priority under 35 U.S.C. §119(e) to U.S. Provisional Application Ser. No. 61/951,520 entitled DATA DIRECTOR FOR IN-HADOOP ETL filed Mar. 11, 2014, the entirety of which is incorporated herein by reference.

This application claims the benefit of priority under 35 U.S.C. §119(e) to U.S. Provisional Application Ser. No. 62/090,362 entitled DATA DIRECTOR FOR IN-HADOOP ETL filed Dec. 11, 2014, the entirety of which is incorporated herein by reference.

This application claims the benefit of priority under 35 U.S.C. §119(e) to U.S. Provisional Application Ser. No. 62/115,836 entitled DATA DIRECTOR FOR IN-HADOOP ETL filed Feb. 13, 2015, the entirety of which is incorporated herein by reference.

This application is a continuation of and claims the benefit of priority under 35 U.S.C. §120 to U.S. patent application Ser. No. 14/643,692 entitled TECHNIQUES FOR GENERATING INSTRUCTIONS TO CONTROL DATABASE PROCESSING filed concurrently herewith, the entirety of which is incorporated herein by reference.

BACKGROUND

The varieties of database software and database languages that may be employed to perform searches and/or other database tasks on data contained within data sets continue to grow in size and complexity. This begets the challenge of generating instructions to perform database tasks for individuals not well versed in the intricacies of doing so.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

A computer-program product tangibly embodied in a non-transitory machine-readable storage medium, the computer-program product including instructions operable to cause a computing device to perform operations including receive an indication of a specified task to be performed, wherein the specified task comprises a first set of one or more subtasks; receive an indication of a specified source device to perform at least the first set of one or more subtasks, wherein the source device stores a source data set to serve as an input to performance of the specified task; retrieve from the specified source device an indication of a source processing environment currently available within at least the specified source device in response to the receipt of the indication of the specified source device, wherein the indication of the source processing environment comprises indications of an identity and version level of a database routine of the specified source device; determine a first set of one or more languages able to be interpreted by the database routine of the specified source device based on the identity and version level of the database routine of the specified source device; for each subtask of the first set of subtasks, select a language of the first set of languages in which to generate instructions to perform the subtask based on at least one aspect of the source processing environment; generate the instructions to perform each subtask of the first set of subtasks; and transmit first task instructions comprising the instructions generated to perform each subtask of the first set of subtasks to the specified source device.

A computer-implemented method includes receiving, at a coordinating device, an indication of a specified task to be performed, wherein the specified task comprises a first set of one or more subtasks; receiving, at the coordinating device, an indication of a specified source device to perform at least the first set of one or more subtasks, wherein the source device stores a source data set to serve as an input to performing the specified task; retrieving from the specified source device an indication of a source processing environment currently available within at least the specified source device in response to receiving the indication of the specified source device, wherein the indication of the source processing environment comprises indications of an identity and version level of a database routine of the specified source device; determining a first set of one or more languages able to be interpreted by the database routine of the specified source device based on the identity and version level of the database routine of the specified source device; for each subtask of the first set of subtasks, selecting a language of the first set of languages in which to generate instructions to perform the subtask based on at least one aspect of the source processing environment; generating the instructions to perform each subtask of the first set of subtasks; and transmitting first task instructions comprising the instructions generated to perform each subtask of the first set of subtasks to the specified source device.

An apparatus includes a processor component; a task selector for execution by the processor component to receive an indication of a specified task to be performed, wherein the specified task comprises a first set of one or more subtasks; a source selector for execution by the processor component to receive an indication of a specified source device to perform at least the first set of one or more subtasks, and to retrieve from the specified source device an indication of a source processing environment currently available within at least the specified source device in response to the receipt of the indication of the specified source device, wherein the source device stores a source data set to serve as an input to performing the specified task, and the indication of the source processing environment comprises indications of an identity and version level of a database routine of the specified source device; and an instruction generator for execution by the processor component to determine a first set of one or more languages able to be interpreted by the database routine of the specified source device based on the identity and version level of the database routine of the specified source device, select a language of the first set of languages in which to generate instructions for each subtask of the first set of subtasks based on at least one aspect of the source processing environment, generate the instructions to perform each subtask of the first set of subtasks, and transmit first task instructions comprising the instructions generated to perform each subtask of the first set of subtasks to the specified source device.

A computer-program product tangibly embodied in a non-transitory machine-readable storage medium, the computer-program product including instructions operable to cause a computing device to perform operations including receive an indication of a specified task to be performed, wherein the specified task comprises first and second subtasks; receive an indication of a specified source device to perform the first and second subtasks, wherein the source device stores a source data set to serve as an input to performance of the specified task; retrieve from the specified source device an indication of a source processing environment currently available within at least the specified source device in response to the receipt of the indication of the specified source device, wherein the indication of the source processing environment comprises indications of an identity and version level of a database routine of the specified source device; determine a first set of one or more languages able to be interpreted by the database routine of the specified source device based on the identity and version level of the database routine of the specified source device; determine whether to perform the first and second subtasks sequentially or at least partly in parallel based on at least one aspect of the source processing environment; select a language of the first set of languages in which to generate instructions to perform at least the first subtask based on the determination of whether to perform the first and second subtasks sequentially or at least partly in parallel; generate the instructions to perform the first subtask in the selected language; and transmit first task instructions comprising at least the instructions generated to perform at least the first subtask to the specified source device.

A computer-implemented method includes receiving, at a coordinating device, an indication of a specified task to be performed, wherein the specified task comprises first and second subtasks; receiving, at the coordinating device, an indication of a specified source device to perform the first and second subtasks, wherein the source device stores a source data set to serve as an input to performance of the specified task; retrieving from the specified source device an indication of a source processing environment currently available within at least the specified source device in response to receiving the indication of the specified source device, wherein the indication of the source processing environment comprises indications of an identity and version level of a database routine of the specified source device; determining a first set of one or more languages able to be interpreted by the database routine of the specified source device based on the identity and version level of the database routine of the specified source device; determining whether to perform the first and second subtasks sequentially or at least partly in parallel based on at least one aspect of the source processing environment; selecting a language of the first set of languages in which to generate instructions to perform at least the first subtask based on the determination of whether to perform the first and second subtasks sequentially or at least partly in parallel; generating the instructions to perform the first subtask in the selected language; and transmitting first task instructions comprising at least the instructions generated to perform at least the first subtask to the specified source device.

An apparatus includes a processor component; a task selector for execution by the processor component to receive an indication of a specified task to be performed, wherein the specified task comprises first and second subtasks; a source selector for execution by the processor component to receive an indication of a specified source device to perform the first and second subtasks, and to retrieve from the specified source device an indication of a source processing environment currently available within at least the specified source device in response to receiving the indication of the specified source device wherein the source device stores a source data set to serve as an input to performance of the specified task, and the indication of the source processing environment comprises indications of an identity and version level of a database routine of the specified source device; and an instruction generator for execution by the processor component to determine a first set of one or more languages able to be interpreted by the database routine of the specified source device based on the identity and version level of the database routine of the specified source device, determine whether to perform the first and second subtasks sequentially or at least partly in parallel based on at least one aspect of the source processing environment, select a language of the first set of languages in which to generate instructions to perform at least the first subtask based on the determination of whether to perform the first and second subtasks sequentially or at least partly in parallel, generate the instructions to perform the first subtask in the selected language, and transmit first task instructions comprising at least the instructions generated to perform at least the first subtask to the specified source device.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other features will become apparent from the following detailed description when considered in conjunction with the drawings.

BRIEF DESCRIPTION OF THE DRAWINGS

FIGS. 4A, 4B, 4C and 4D illustrate examples of prompted entry of parameters for generating task instructions.

DETAILED DESCRIPTION

Figure 1:
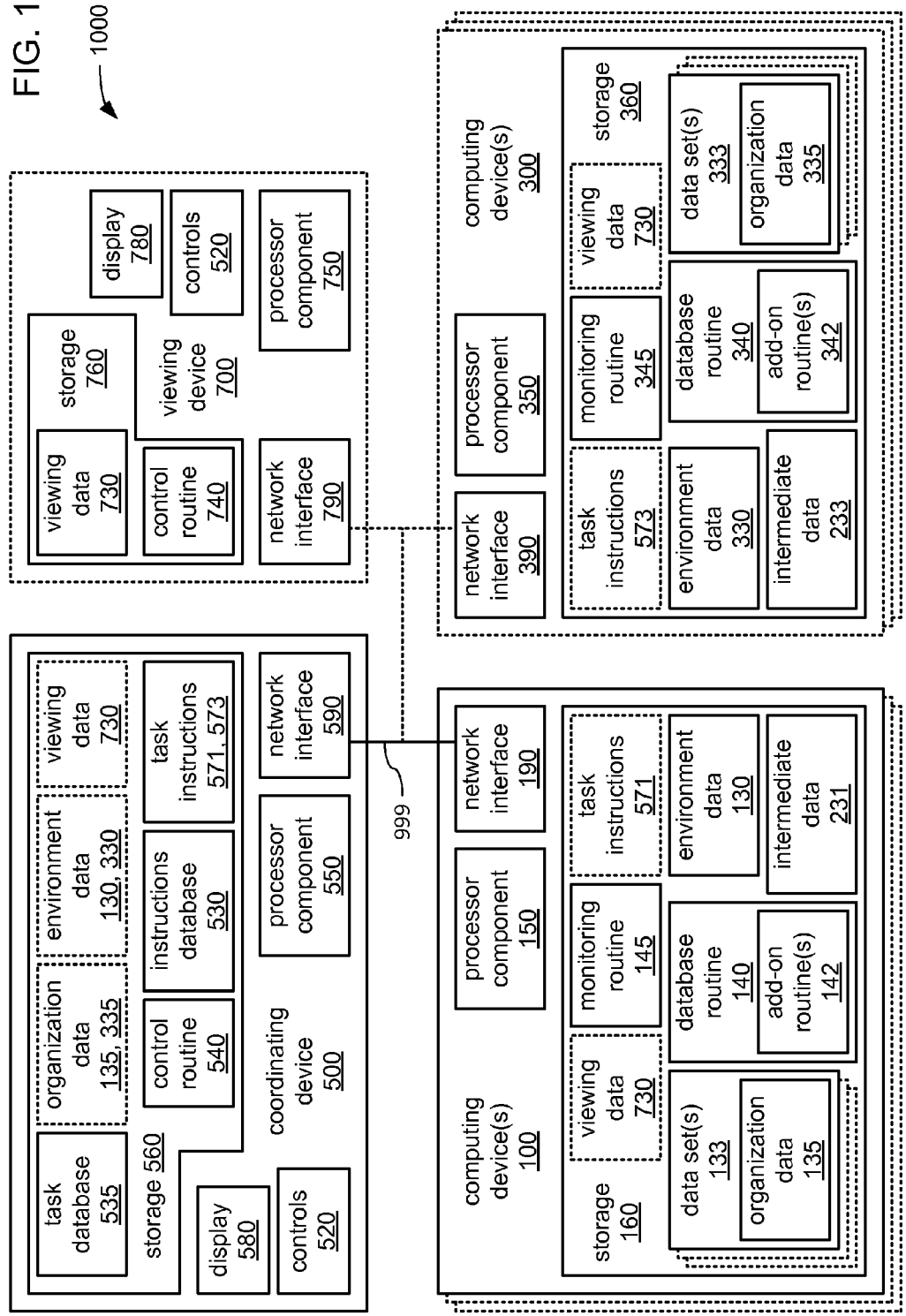
FIG. 1 illustrates an example embodiment of a database system.

Various embodiments described herein are generally directed to techniques for generating database task instructions based on aspects of the processing environment available within at least the source device from which source data is retrieved to perform the task. An operator of a coordinating device may be guided through providing input concerning various aspects of a database task to be performed. As at least selections a source device and source data are specified by the operator, current information concerning the processing environment of at least the source device is automatically retrieved. Where a destination device other than the source device is specified, current information concerning the processing environment of the destination device is also automatically retrieved. Based at least on the retrieved information concerning the processing environment of the source device, one or more database languages are automatically selected in which to automatically generate the instructions to perform the database task.

With such selection of database languages and the generation of instructions within the selected languages performed automatically based on current conditions within one or more processing environments, dynamically changing conditions in the processing environments of multiple computing devices of a database system may be automatically accommodated. More precisely, various factors such as what database routines and what versions thereof are available, current availability of processor and/or storage components, and/or recently observed levels of processing performance of various data operations may be automatically detected and used as inputs at runtime to automatically make a more optimal choice of database language(s) in which to generate instructions. Such detected factors may also be used as inputs at runtime to automatically generate instructions that more optimally employ processing resources for which availability may change too frequently to be taken into account by persons who might seek to generate the instructions to perform a database task themselves. As a result, instructions to perform a database task are generated that take advantage of currently available resources among a frequently changing variety of resources, while avoiding the attempted use of resources that are not currently available such that each database task is able to be performed more quickly.

A user interface of a coordination device may present on a display an assortment of types of database tasks that may be performed by a database system, and await a selection of one of those types of database tasks from that assortment by an operator of the coordination device. The user interface may also present on the display various requests for pieces of information from the operator concerning aspects of the database task to be performed. Among those pieces of information may be indications of a source device, a source data set, one or more portions of the source data set, one or more data operations to perform, one or more control values, and/or a destination device where the destination device is different from the source device.

As discussed herein, the term "database routine" may include software executable by one or more processor components to provide an execution environment in which instructions written in one or more database languages may be executed to perform searches, calculations and/or various analyses of data stored within one or more stored data sets. Therefore, the support provided for the execution of instructions written in one or more database language may include libraries and/or other collections of callable routines that may be somewhat specialized to efficiently perform character-based or pattern matching searches, to efficiently perform calculations to aggregate numerical data values, and/or to efficiently generate various graphical representations of data. However, a database routine may more broadly support the execution of instructions to perform still other tasks that may have little to do with the use and/or manipulation of relatively large data sets. Thus, examples of database routines may include Oracle® Database offered by Oracle® Corporation, Teradata® Database offered by Teradata® Corporation, and Greenplum® Database offered by Pivotal® Software, Inc. However, another example of database routines may include Hadoop® currently maintained by the Apache™ Software Foundation, and Java™ currently maintained by Oracle® Corporation.

Different database routines offered by different vendors often support the use of different database languages in which instructions must be generated to perform a database task. Alternatively or additionally, a single database routine may support the use of multiple different database languages. An example of such a single database routine may be Hadoop. While the open source model of development of Hadoop enables development at a more rapid pace by inviting participation from numerous persons and organizations, this same open source model has also allowed a plethora of specialized functions to become available for addition to Hadoop, including a variety of database languages and/or extensions to database languages in which instructions to perform database tasks may be written.

Indeed, in Hadoop a combination of changes between entities that oversee maintenance of the programming code in which Hadoop is written and its open source development model has created a highly unrestrained community development environment in which different developers feel free to augment the functionality of Hadoop with little coordination among themselves. This has result in numerous competing extensions to Hadoop that may perform similar functions, but in very different ways that are often intended by their developers to address different specialized situations, and with numerous accompanying new database languages or new extensions to existing database languages that must be used to take advantage of each of the competing extensions. The result is sometimes referred to as the "Hadoop zoo" of database languages that presents a quandary in which it may be highly desirable to be able to choose from among different ones of the database languages to make use of their different associated extensions at different times, but where the range of available database languages is too extensive for the vast majority of programmers to fully comprehend. Most who are trained to write programs to perform database tasks in Hadoop are trained to do so in a relatively limited subset of those database languages and must then learn about others of the database languages over time as their experience in working with Hadoop grows. Thus, the wide variety of database languages created over time as part of extending the capabilities of Hadoop paradoxically discourages the use of those capabilities.

As the operator provides input concerning source and/or destination devices through the user interface, that input may be automatically used to identify the one or more processing environments in which the database task is to be performed. More specifically, information concerning the processing environment(s) of the source and/or destination devices may be retrieved therefrom to determine various aspects of the functionality available within each. Such retrieved information may include one or more of the identity and/or version level of any installed database routines, identity and/or version level of any add-on routines by which the functionality of database routine(s) may be augmented. Such retrieved information may also include the quantity of computing device nodes making up a cluster in embodiments where the source and/or destination devices are implemented as clusters of computing devices. Such retrieved information may further include indications of quantity and/or type of storage devices, and/or amount of storage space available within one or more storage devices. Still further, such retrieved information may include observations of performance of earlier database tasks, including and not limited to, components of the source and/or destination devices employed in performing earlier database tasks, and/or amounts of time required in performing earlier database tasks.

As the operator provides input concerning source and/or destination data sets, that input may be used to determine one or more aspects of the source and/or destination data sets. More specifically, information concerning the manner in which data is organized within the source and/or destination data sets may be retrieved therefrom, such as rows, columns, dimensions, manner of indexing, etc. Such information may be employed to automatically prompt the operator of the coordinating device to specify what portion(s) of at least the source data are to be employed as inputs to the database task to be performed. As the operator provides input identifying those portion(s), information concerning the data values within those portions may be retrieved from the source data set from within the source device and/or from the destination data set from within the destination device.

Upon receipt of all of the operator's input specifying various aspects of database task, the coordinating device may employ at least the indications of identity and/or version level(s) of database routine(s) installed within the source and/or destination devices to automatically determine what database languages are supported by each database routine that may be involved in the database task. In so doing, the coordinating device may take into account the manner in which the database language support of each database routine may have been augmented through the addition of one or more add-on routines. The coordinating device may then automatically select one or more database languages from among the supported languages in which to generate instructions to perform the database task. More specifically, the coordination device may automatically select a language for each subtask of the database task from among the supported languages.

The coordinating device may also base its automatic selection of database languages for each subtask from among the supported database languages on indications retrieved from the source and/or destination devices of available types of storage devices and/or the amount of storage space available in each. More specifically, a supported database language in which to generate instructions to perform a subtask may be automatically selected based on an automatically identified opportunity to make use of a currently available amount of storage space within a particular storage device. Alternatively or additionally, the coordinating device may also base its automatic selection of database languages for each subtask from among the supported database languages on indications retrieved from the source and/or destination devices of the manner in which previous database tasks were performed and/or the amount of time required to perform those previous database tasks.

The coordinating device may further base its automatic selection of database languages for each subtask from among the supported database languages on indications received from the source and/or destination devices of currently available quantities of computing device nodes within cluster(s) in embodiments in which the source and/or destination devices are incorporated into clusters of computing devices. Alternatively or additionally, the instructions to perform one or more of the subtasks may selectively be generated to employ differing quantities of nodes of a cluster in embodiments in which the source and/or destination devices are incorporated into clusters of computing devices.

With general reference to notations and nomenclature used herein, portions of the detailed description that follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an example embodiment of a database system 1000 incorporating one or more computing devices 100 and/or 300, a coordinating device 500 and/or a viewing device 700. Each of these computing devices 100, 300, 500 and 700 may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc. Embodiments are not limited in this context. It should be noted that although quantities of up to three of each of the computing devices 100 and 300 are specifically depicted such that each of the computing devices 100 and 300 may be a computing device node of a cluster, such clusters may be made up of other quantities of the computing devices 100 and 300.

As depicted, these computing devices 100, 300, 500 and/or 700 may exchange communications conveying instructions to perform a database task, information employed in generating those instructions and/or data associated with the database task through a network 999. However, one or more of the computing devices 100, 300, 500 and/or 700 may exchange other data entirely unrelated to generating instructions to perform a database task and/or the performance of a database task with each other and/or with still other computing devices (not shown) via the network 999. In various embodiments, the network 999 may be a single network that may extend within a single building or other relatively limited area, a combination of connected networks that may extend a considerable distance, and/or may include the Internet. Thus, the network 999 may be based on any of a variety (or combination) of communications technologies by which communications may be effected, including without limitation, wired technologies employing electrically and/or optically conductive cabling, and wireless technologies employing infrared, radio frequency or other forms of wireless transmission.

As will be explained in greater detail, the coordinating device 500 may prompt an operator of the coordinating device 500 to provide information concerning various aspects of a database task to be performed by the computing device(s) 100 serving as a source device, and by either of the computing device(s) 100 or 300 as a destination device. The coordinating device 500 may automatically select one or more database languages supported by database routines 140 and/or 340 of the computing devices 100 and/or 300, respectively, in which to generate the instructions based on various aspects of the processing environments of the computing devices 100 and/or 300. Further, the instructions may specify that an indication of the results of performing the database task be transmitted to the viewing device 700 for presentation thereby.

In various embodiments, the computing device(s) 100 may each incorporate one or more of a processor component 150, a storage 160 and a network interface 190 to couple the computing device 100 to the network 999. The storage 160 may store one or more of each of the database routine 140, environment data 130, a data set 133, a monitoring routine 145, intermediate data 231, task instructions 571 and viewing data 730. Each of the data sets 133 may include organization data 135. The database routine 140 may be augmented with one or more add-on routines 142. The database routine 140 may incorporate a sequence of instructions operative on the processor component 150 of a single computing device 100 or multiple ones of the computing device 100 to implement logic to perform various functions.

In embodiments of the database system 1000 that include the computing device(s) 300 that may each be made up of a substantially similar set of components as each of the computing device(s) 100. More specifically and not unlike the computing device(s) 100, the computing device(s) 300 may each incorporate one or more of a processor component 350, a storage 360 and a network interface 390 to couple the computing device 300 to the network 999. The storage 360 may store one or more of each of the database routine 340, environment data 330, a data set 333, a monitoring routine 345, intermediate data 233, task instructions 573 and viewing data 730. Each of the data sets 333 may include organization data 335. The database routine 140 may be augmented with one or more add-on routines 342. The database routine 340 may incorporate a sequence of instructions operative on the processor component 350 of a single computing device 300 or multiple ones of the computing device 300 to implement logic to perform functions similar to those that may be performed by one or more of the computing device 100.

Returning to the one or more computing devices 100, in executing the database routine 140, the processor component 150 may await reception of instructions to perform a database task. As will be explained in greater detail, the processor component 150 may be caused to operate the network interface 190 to receive such instructions transmitted to one or more of the computing devices 100 by the coordinating device 500 as the task instructions 571. The database routine 140 may support the writing of instructions to perform a database task in one or more specific database languages. Examples of such database languages may be DS2, Java, MapReduce, Scala, SQL or SPARK. The database routine 140 may be augmented in its functionality, including which database languages it supports, by the addition of one or more add-on routines 142 to the database routine 140.

The monitoring routine 145 may be a software component of an operating system executed by the processor component 150 to support execution of the database routine 140, may be a software component of the database routine 140, or may be entirely separate software executed by the processor component 150. The monitoring routine 145 may monitor the performance of database tasks by the database routine 140, and may store indications of various aspects of such performance as part of the environment data 130. Among the aspects of the performance of database tasks that may be so recorded may be the amount of time required to perform a database task, indications of what operations were performed in the process or performing a database task and/or how frequently each operation was performed, what components of the database routine 140 and/or what add-on routines 142 were employed in performing a database task, and/or when a database task was performed.

Alternatively or additionally, the monitoring routine 145 may perform various tests of and/or make various inquiries of software and/or hardware components of one or more of the computing devices 100 to identify those components and/or determine the current status of those components. By way of example, the monitoring routine 145 may retrieve identifiers of the database routine 140 and/or any add-on routines 142 by which the database routine 140 may be augmented, the processor component 150 and/or an operating system that the processor component 150 may execute to support execution of the database routine 140, and/or one or more storage devices making up the storage 160. Alternatively or additionally, the monitoring routine 145 may retrieve identifiers of version levels of one or more of these. In embodiments in which there is more than one of the computing devices 100, the monitoring routine 145 of one of the computing devices 100 may perform one or more tests and/or make various inquires of one or more hardware and/or software components of others of the computing devices 100 to identify those components and/or their version levels. Alternatively or additionally, the monitoring routine 145 of one of the computing devices 100 may retrieve indications of how many of the computing devices 100 there are and/or the current status of each. The monitoring routine 145 may store indications of the results of such tests and/or responses to such inquiries as part of the environment data 130.

Thus, prior to, during and/or following execution of the database routine 140 to execute instructions to perform a database task, the monitoring routine 145 may retrieve identifiers of various hardware and/or software components of one or more of the computing device 100, including and not limited to identifiers of the database routine 140 and/or any add-on routines 142 by which the functionality of the database routine 140 may be augmented. In some embodiments, the monitoring routine 145 may recurringly perform such tests and/or make such inquiries to detect any changes in the hardware and/or software components that make up one or more of the computing devices 100, and/or to update the environment data 130 with more current indications of the status of each.

During execution of the database routine 140 to execute instructions to perform a database task, the processor component 150 may be caused to temporarily store portions of data employed in the performance of that database task as the intermediate data 231. In some embodiments, the intermediate data 231 may be made up of portions of data retrieved from one or more of the data sets 133, and/or data resulting from the performance of various operations of the database task that may be stored as part of one or more of the data sets 133. Alternatively or additionally, in embodiments of the database system 1000 that include one or more of the computing devices 300, the intermediate data 231 and its counterpart intermediate data 233 may be caches of data exchanged between at least one of each of the computing devices 100 and 300 as part of cooperation therebetween to perform a database task.

Indeed, as will be explained in greater detail, at least one of the computing devices 100 may be designated as a source device of data employed as input to a database task and at least one of the computing devices 300 may be designated as a destination device for data generated as a result of performance of the database task. In such cooperation, the processor component 150 may execute the database routine 140 to execute instructions for performing part of a database task, while the processor component 350 may similarly execute the database routine 340 to execute other instructions for performing another part of the same database task. During the performance of a database task, whether solely by one or more of the computing devices 100 or by a combination of one or more of each of the computing devices 100 and 300, the processor component 150 and/or 350 of at least one of the computing devices 100 and/or 300, respectively, may generate the viewing data 730, and/or may transmit the viewing data 730 to the viewing device 700 to enable presentation of a visual of the results of the database operation on the display 780.

In various embodiments, the coordinating device 500 incorporates one or more of a processor component 550, a storage 560 and a network interface 590 to couple the coordinating device 500 to the network 999. The storage 560 may store one or more of a control routine 540, an instructions database 530, a task database 535, one or both of the environment data 130 and the instructions database 530, one or both of the organization data 135 and the task database 535, the task instructions 571 and/or 573, and the viewing data 730. The control routine 540 may incorporate a sequence of instructions operative on the processor component 550 to implement logic to perform various functions.

Figure 2A:
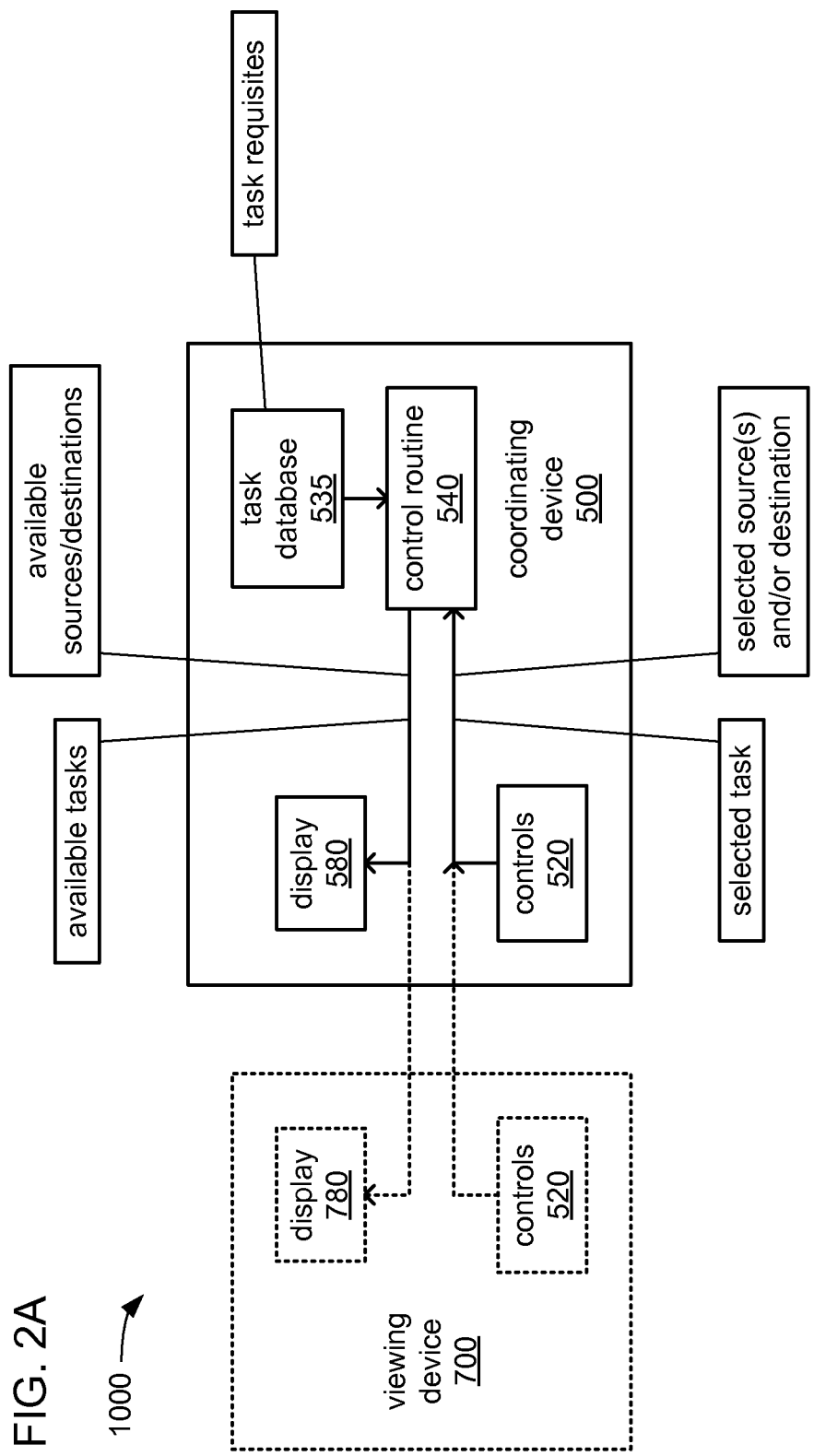
FIGS. 2A, 2B, 2C, 2D, 2E and 2F, together, illustrate an example embodiment of generating task instructions based on one or more processing environments.

In executing the control routine 540, the processor component 550 may operate the display 580 and the manually-operable controls 520 to provide a user interface to an operator of the coordinating device 500 in which the processor component guides the operator through specifying various aspects of a database task to be performed by the computing device(s) 100 and/or 300. FIG. 2A depicts an example of guiding an operator of the coordinating device 500 through specifying such aspects. As depicted, the task database 535 may include indications of requisite pieces of information needed to perform each of a variety of database tasks and/or indications of subtasks that may make up each database task. As a result of executing the control routine 540, the processor component 550 may operate the display 580 to present an assortment of database tasks that are included in the task database 535 and that may be performed by the database system 1000 along with a prompt for the operator to select one of the database tasks to be performed. The processor component 550 may then monitor the manually operated controls 520 to await an indication of operation of the controls 520 by operator to select a database task from among the presented assortment.

Either after or as part of presenting the assortment of tasks, the processor component 550 may also operate the display 580 to present an assortment of the currently available devices in which data sets may be stored to enable the selection of one or more of those devices as source and/or destination devices by the operator. More specifically, an assortment of devices, including one or both of the computing device(s) 100 and/or 300, may be presented to allow the operator to specify a device within the assortment as one that stores a data set from which source data is to be retrieved for use as an input to the database task. The operator may additionally specify the same device to also serve as the destination device within which data output by the database task is to be stored. Alternatively, the operator may specify a different one of the devices within the assortment as the destination device. For example, and as will be depicted in succeeding figures, at least one of the computing devices 100 may be selected by the operator to serve as both source and destination devices, or at least one of the computing devices 100 may be selected by the operator to serve as the source device while at least one of the computing devices 300 may be selected by the operator to serve as the destination device. The processor component 550 may then monitor the manually operated controls 520 to await indications of operation of the controls 520 by the operator to select source and/or destination devices from among the presented assortment.

Returning to FIG. 1, further execution of the control routine 540 may cause the processor component 550 to employ the received indications of operator-made selections of source and/or destination devices to transmit requests to those device to provide indications of aspects of the their processing environments and/or indications of what data sets are stored therein. Thus, in embodiments in which the computing device(s) 100 and/or 300 have been selected by the operator to serve as the source and/or destination devices, the processor component 550 may transmit via the network 999 requests for indications of aspects of their processing environments and/or what data sets are available within each.

Figure 2B:
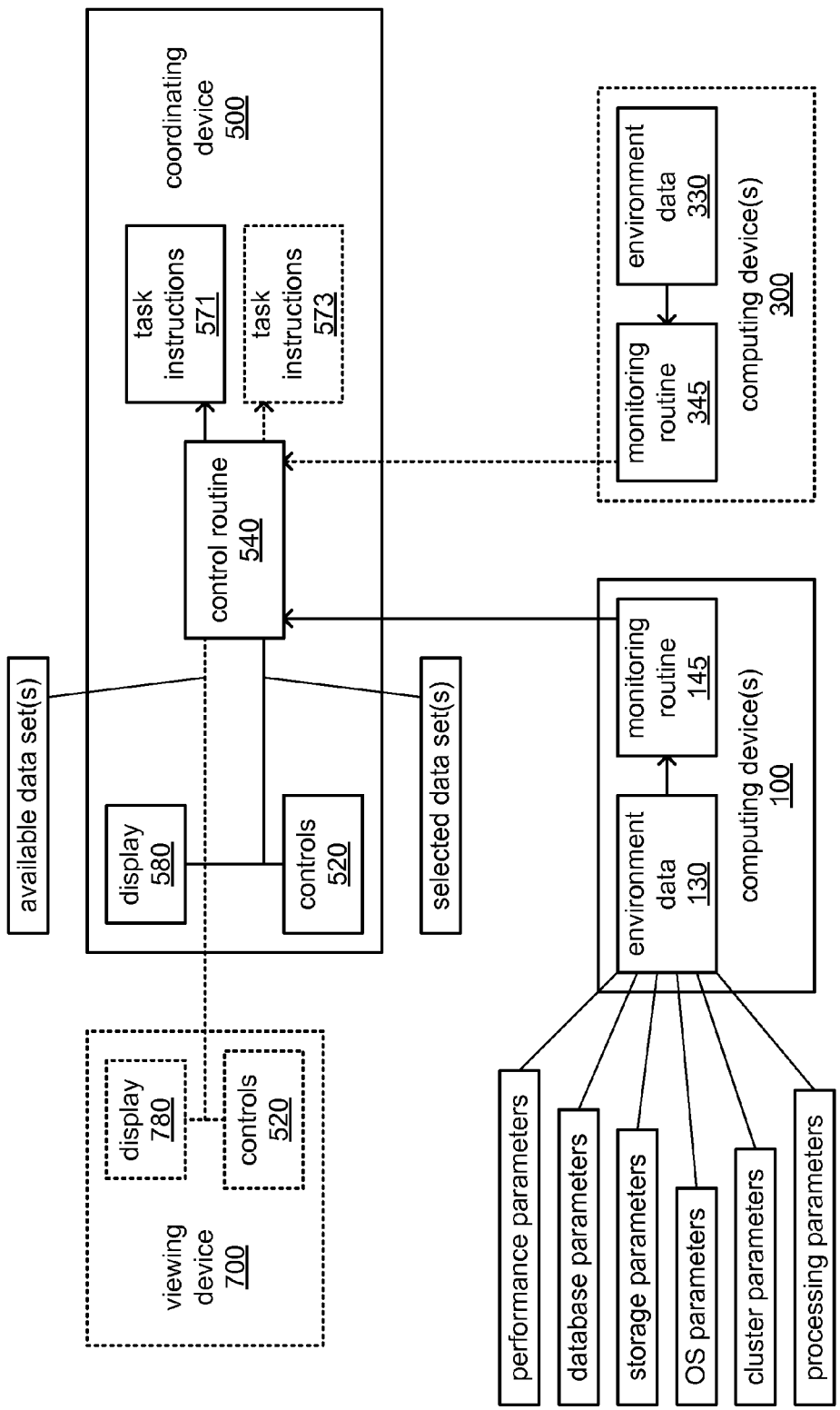

FIG. 2B depicts an example of guiding an operator of the coordinating device 500 through specifying data set(s) to serve as source and/or destination data sets. As depicted, the monitoring routines 145 and/or 345 may respond to the requests received from the coordinating device 500 via the network 999 for indications of aspects of processing environment(s) by transmitting at least a portion of the environment data 130 and/or 330, respectively, to the coordinating device 500. As previously discussed, the environment data 130 and/or 330 may include indications of aspects of the performance of previous database tasks. Such indications may include identifiers of the data set(s) 133 and/or 333 available within each of the computing device(s) 100 and/or 300, respectively. The processor component 550 may then use such indications of the data set(s) 133 and/or 333 that are available to operate the display 580 to present assortments of the data set(s) 133 and/or 333 to enable the operator of the coordinating device 500 to select the data set(s) to become the source and/or destination data set(s) from the presented assortment(s). The processor component 550 may then monitor the controls 520 for indications of receipt of the selection(s) of source and/or destination data sets made by the operator.

Alternatively, the environment data 130 and/or 330 may not include identifiers of the data set(s) 133 and/or 333 that are available within each of the computing device(s) 100 and/or 300, respectively. However, as previously discussed, the environment data 130 and/or 330 may include identifiers of the database routines 140 and/or 340, respectively. The processor component 550 may employ such identifiers to automatically select database language(s) supported by the database routines 140 and/or 340 to generate database queries to obtain indications of the available data set(s) 133 and/or 333, respectively, and may transmit those queries to the computing device(s) 100 and/or 300. In response, the database routines 140 and/or 340 may provide the coordinating device with those indications of the data sets 133 and/or 333 that are available within the computing device(s) 100 and/or 300, respectively, which the processor component 550 may then use to present the assortments of data set(s).

Returning to FIG. 1, further execution of the control routine 540 may cause the processor component 550 to employ the received indications of operator-made selections of ones of the data set(s) 133 and/or 333 to serve as source and/or destination data sets to generate queries to one or both of the database routines 140 and 340 to provide indications of the organization of data within each of the selected ones of the data sets 133 and/or 333. The processor component 550 may then transmit such queries to the computing device(s) 100 and/or 300 via the network 999. In response to such queries, the database routines 140 and/or 340 may provide at least portions of the organization data 135 and/or 335 from within the selected ones of the data sets 133 and/or 333 to the coordinating device 500 via the network.

Figure 2C:
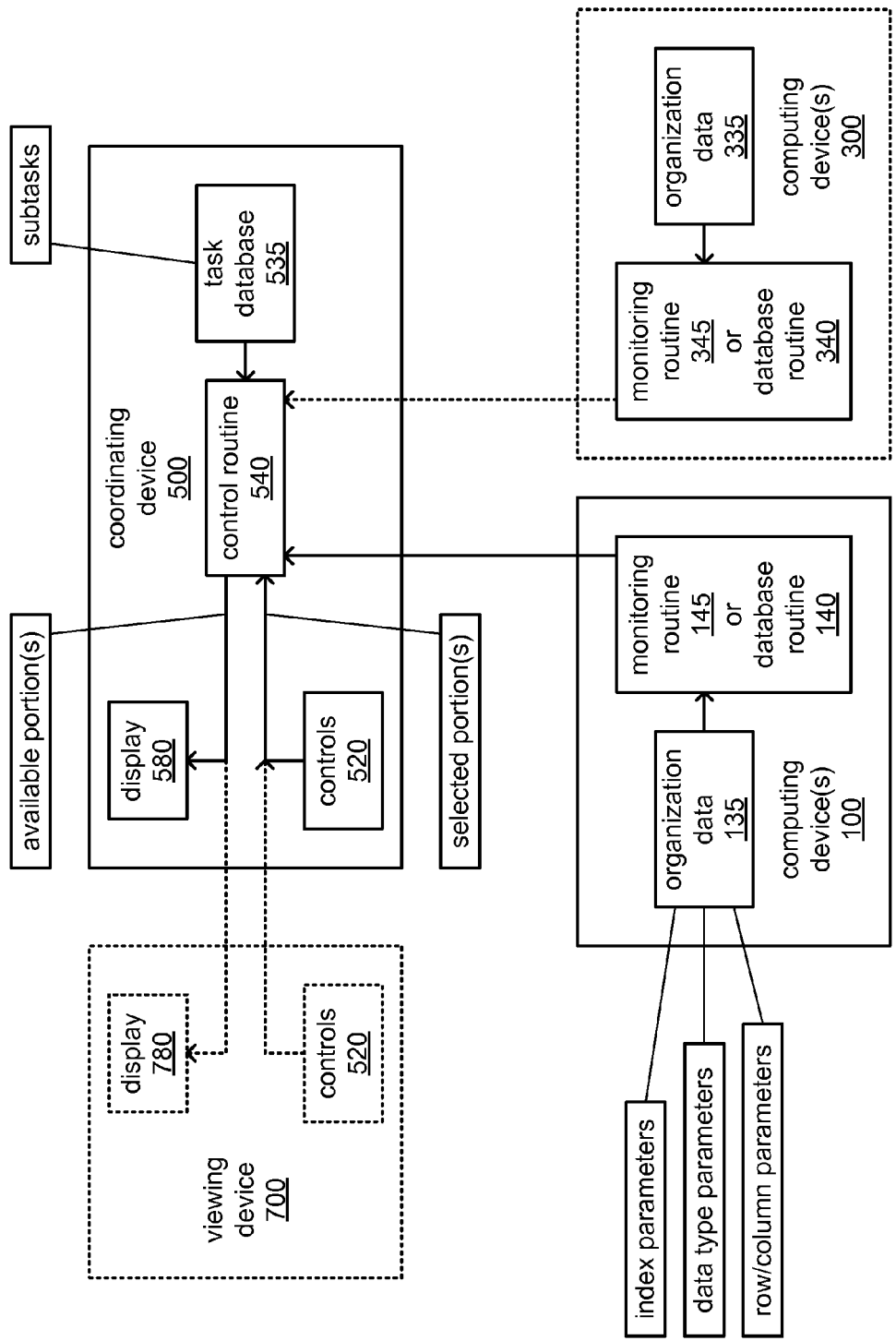

FIG. 2C depicts an example of guiding an operator of the coordinating device 500 through their selection of one or more portions of each selected one of the data set(s) 133 and/or 333. As depicted, the organization data 135 and/or 335 may include indications of the rows and/or columns (or other dimensional ordering) of the data, any indices used in accessing data values, and/or the data types of those data values (e.g., bit, byte, word, text, 64-bit floating point, etc.). The processor component 550 may employ such indications of the manner in which the data within selected ones of the data set(s) 133 and/or 333 are organized to present assortments of rows, columns and/or other dimensional ordering for each of the selected data set(s) 133 and/or 333 to enable the selection of portions of the selected ones of the data set(s) 133 and/or 333 by the operator of the coordinating device 500 through selection of particular rows, columns, etc. The processor component 550 may then monitor the controls 520 for indications of entry of such selection by the operator.

As also depicted, presentations of assortments of portion(s) of data set(s) may be accompanied by presentations of assortments of database operations that may be performed as part of the database task. The processor component 550 may employ indications within the task database 535 of what subtasks may be included in the database task to determine what assortment(s) of database operations to so present. Further, along with the presentation of assortments of database operations may also be a presentation of prompts for the entry of values, such as ranges of values and/or other variables that may control the performance of the database task. The processor component 550 may then monitor the controls 520 for indications of selections by the operator of operations to be performed and/or for indications of values or ranges of values having been input.

As depicted, throughout FIGS. 2A-C, as an alternative to such operation of the display 580 and the controls 520, the processor component 550 may cooperate with the viewing device 700 via the network 999 to cause such a presentation to be made on a display 780 thereof and/or to monitor manually-operable controls 720. More precisely, the viewing device 700 may be operable as a remote terminal of the coordinating device 500, or may execute a web browser and/or other routine by which the processor component 550 may make use of the display 780 and the controls 720 to remotely interact with an operator of the viewing device 700 in lieu of interacting more directly with an operator of the coordinating device 500.

Returning to FIG. 1, with the operator of the coordinating device 500 (or of the viewing device 700) having been guided through providing indications of various aspects of the database task to be performed, the processor component 550 may employ those indications along with indications of processing environments provided by the environment data 130 and/or 330, and/or indications of organization of data provided by the organization data 135 and/or 335 to generate instructions for the performance of the database task. More specifically, where one or more of the computing devices 100 were selected by the operator to be both the source and destination devices, the processor component 550 may limit the information used in generating the instructions to information concerning the processing environment and/or organization of data within the computing device(s) 100. In so doing, the processor component 550 may generate only the task instructions 571 to be transmitted to one of the computing devices 100 to be executed to perform the entirety of the database task. However, where one or more of the computing devices 100 were selected by the operator to be the source device and one or more of the computing devices 300 were selected by the operator to be the destination device, the processor component 550 employs information concerning the processing environments and/or organization of data within both of the computing devices 100 and 300. In so doing, the processor component 550 may generate both of the task instructions 571 to be transmitted to one of the computing devices 100 selected by the operator as the source device to be executed to perform part of the database task, and the task instructions 573 to be transmitted to one of the computing devices 300 selected by the operator as the destination device to be executed to perform the remainder of the database task.

Figure 2D:
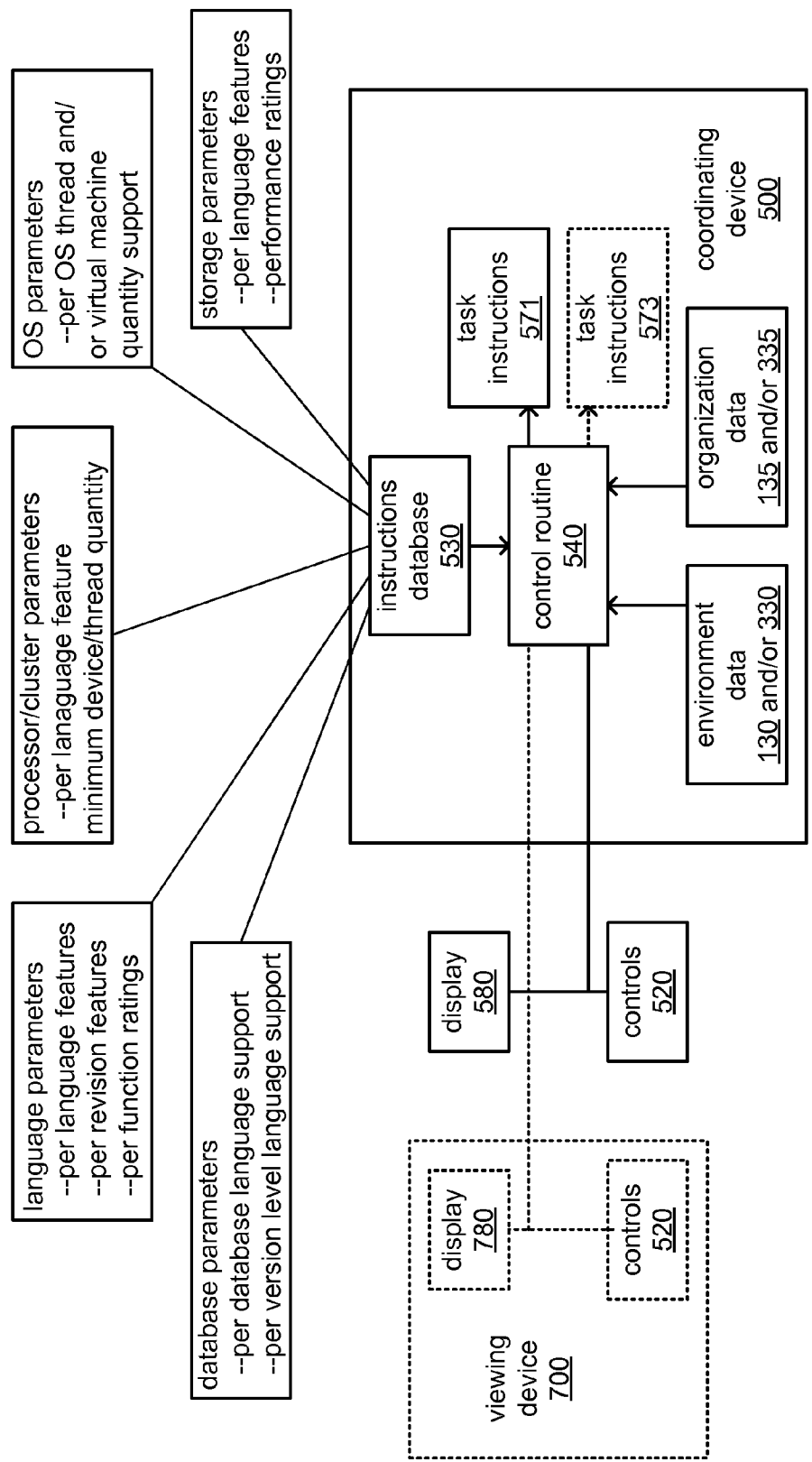

FIG. 2D depicts an example of employing such information in generating one or both of the task instructions 571 and 573. The processor component 550 may initially employ indications of the identities and/or version levels of the database routines 140 and/or 340 in determining what database language(s) are supported for use in generating the instructions to perform the database operation. Thus, for subtasks to be performed within one or more of the computing devices 100, the processor component may limit the range of database languages considered for generating the task instructions 571 for the performance of those subtasks to database languages supported by the database routine 140, including any augmented support for database languages that may be provided through the addition of one or more add-on routines 142. Similarly, for subtasks to be performed within one or more of the computing devices 300

(if there are any), the processor component may limit the range of database languages considered for generating the task instructions 573 for the performance of those subtasks to database languages supported by the database routine 340, including any augmented support for database languages that may be provided through the addition of one or more add-on routines 342.

As previously discussed, the environment data 130 and/or 330 may include indications of various aspects of the processing environments of the computing devices 100 and/or 300, respectively. More specifically, the environment data 130 and/or 330 may include database parameters such as identifiers and/or version levels of the database routines 140 and/or 340, along with identifiers and/or version levels of any add-on routines 142 and/or 342 by which the database routines 140 and/or 340 may have been augmented. Also, the environmental data 130 and/or 330 may include storage parameters such as an indication of the quantities and/or types of the storage devices making up the storages 160 and/or 360, as well as indications of how much unused storage space is currently available in each. Additionally, the environmental data 130 and/or 330 may include performance parameters such as indications of the manner in which previous database tasks were performed and/or how much time was required for those performances. Further, the environment data 130 and/or 330 may include cluster parameters such as an indication of a quantity of the computing devices 100 and/or 300 in embodiments in which there are more multiple ones of the computing devices 100 and/or 300 forming clusters. Still further, the environment data 130 and/or 330 may include processing parameters such as identifiers and/or version levels of the processor components 150 and/or 350, and OS parameters such as identifiers and/or version levels of operating systems executed by the processor components 150 and/or 350 to support the execution of the database routines 140 and/or 340, respectively.

As also depicted in FIG. 2D, the instructions database 530 may include indications of aspects of database languages, database routines, processor components, storage devices and/or operating systems. More specifically, the instructions database 530 may include database parameters such as indications of what database languages are supported by each of multiple database routines that may be found within a particular computing device, and/or what database languages are supported by various revisions of each of those database routines. Among the indications of support for database languages may be indications of what database language features are supported by different versions of a particular database routine, with some of features potentially offering a considerable increase in speed if identified as available to be used to perform a particular subtask. Also, the instructions database 530 may include storage parameters such as indications of types of storage devices that may offer a considerable increase in speed in performing particular operations of a particular database language, if identified as available in a particular computing device. Additionally, the instructions database 530 may include processor parameters and/or clustering parameters such as indications of minimum quantities of threads and/or minimum quantities of computing devices in a cluster to take advantage of particular features of particular database languages that may offer a considerable increase in speed if identified as available. Further, the instructions database may include operation system (OS) parameters such as indications of support offered by various operating systems and/or other support software for the execution of various minimum quantities of threads to enable support for various database language features.

More broadly, the instructions database 530 may include entire sets of instructions making each of a variety of database languages. The instructions database 530 may include general indications of relative preferences of one database language over another where a particular database routine supports more than one. However, the instructions database 530 may also include indications of relative preference for using particular database language features, if found to be supported, that may override the more general indications of relative preference. By way of example, where a particular database routine has been augmented with one or more add-on routines that add support for a particular database language feature, that particular database language feature may be indicated as sufficiently advantageous to use that its availability may lead to the automatic selection and use of a database language that is otherwise generally less preferred relative to one or more other database languages when that database language feature is not available. Such a database language feature may be an additional instruction that is the equivalent of multiple other instructions and that is executable more quickly than those multiple other instructions. By way of example, such a database language feature may more efficiently progress through an array of data values, make use of single-instruction multiple-data (SIMD) registers, and/or cause the use of a quantity of random-access memory (RAM) to achieve greater performance in processing a portion of data at times when a sufficient quantity of RAM is available.

Thus, in determining what database languages are supported by the database routines 140 and/or 340, the processor component 550 may at least match the identifiers of those database routines to identifiers of a variety of database routines in the database parameters to retrieve an indication of what each of the database routines 140 and/or 340 support. The processor component 550 may additionally match identifiers of any add-on routines 142 and/or 342 by which the database languages supported by the database routines 140 and/or 340 may have been augmented.

Having determined which database languages are supported by the database routines 140 and/or 340, the processor component 550 may then, for each subtask of the database task to be performed, separately automatically select one of the supported database languages in which to generate the instructions for the performance of that subtask. To do so, the processor component may, for each subtask, automatically determine which one of the database languages supported by the database routine 140 or 340 that is to perform that subtask is generally preferred based on the general indications of relative preferences in the instructions database 530. However, the processor component 550 may also evaluate the various database language features of the supported database languages that may be of use in performing each of the subtasks to determine if there is a database language feature that is sufficiently advantageous to use in improving the processing speed with which that subtask is performed as to automatically override the selection of database language for that subroutine based on the general indications of relative preference.

Some of such advantageous database language features may require the availability of one or more resources in a processing environment that may not be consistently available such that the processor component 550 may selectively consider such database language features depending on whether or not an indication is received from one of the computing devices 100 and/or 300 that the necessary resource(s) are currently available. By way of example, one or more particular instructions of a particular supported database language may make advantageous use of non-volatile solid state storage (e.g., one or more FLASH storage devices) and/or advantageous use of volatile solid state storage (e.g., RAM) to progress through an array with greater efficiency, but may require a particular minimum amount of available storage space within the volatile and/or non-volatile solid state storage to be used. Thus, the processor component 550 may rely on indications in the environment data 130 and/or 330 of whether there is currently a sufficient storage space available among one or more of such storage devices to enable use of the one or more particular instructions to determine whether or not to consider the use of that particular database language based on its inclusion of the one or more particular instructions. However, a restriction may be imposed against such use of such storage space by a storage space usage policy enforced by personnel overseeing operation of the computing devices 100 and/or 300. The environment data 130 and/or 330 may convey an indication to the processor component 550 that such use of such storage space has been prohibited such that the particular one or more instructions cannot be used, despite other requirements for their use being met.

By way of example, one or more particular instructions of a particular supported database language may make advantageous use of multiple threads and/or multiple computing device nodes in a cluster of computing devices to perform multiple functions on multiple pieces of data in parallel, but may require a particular minimum quantity of threads and/or nodes to be used. Thus, the processor component 550 may rely on indications in the environment data 130 and/or 330 of whether there is currently a sufficient quantity of threads and/or computing device nodes in a cluster to enable use of the one or more particular instructions to determine whether or not to consider the use of that particular database language based on its inclusion of the one or more particular instructions. Further, it may be that while there is sufficient support provided by a processor component and/or multiple computing device nodes, the operating system executed by that processor component and/or one or more of those multiple computing device nodes may in some way prevent such support from being provided. The processor component 550 may rely on an indication of such a limitation imposed by an operating system to refrain from considering the use of the one or more particular instructions, despite other requirements for doing so currently being met.

It should be noted that such automatic selection of database languages per subtask presumes that the database routines 140 and/or 340 are able to support such mixed use of database languages across multiple subtasks of a single database task. In embodiments in which one of the database routines 140 or 340 is not able to support such mixed use of database languages, such a limitation may be indicated among the database parameters of the instructions database 530. The processor 550 may respond to such an indication by automatically selecting a single supported database language for use in generating instructions for all subtasks to be performed by the one of the database routines 140 or 340 that is unable to support such mixed use of database languages.

Regardless of whether each of the task instructions 571 and/or 573 is generated using a single supported database language or multiple supported database languages, the processor component 550 generates the task instructions 571 and/or 573. More specifically, where one or more of the computing devices 100 are selected by the operator to serve as both the source and destination devices, the processor component 550 may generate the task 571 using either a single or multiple database languages supported by the database routine 140. Alternatively, where one or more of the computing devices 100 are selected by the operator to serve as the source device and one or more of the computing devices 300 are selected by the operator to serve as the destination device, the processor component 550 may generate each of the tasks 571 using either a single or multiple database languages supported by the database routines 140 and 340, respectively.

Figure 2E:
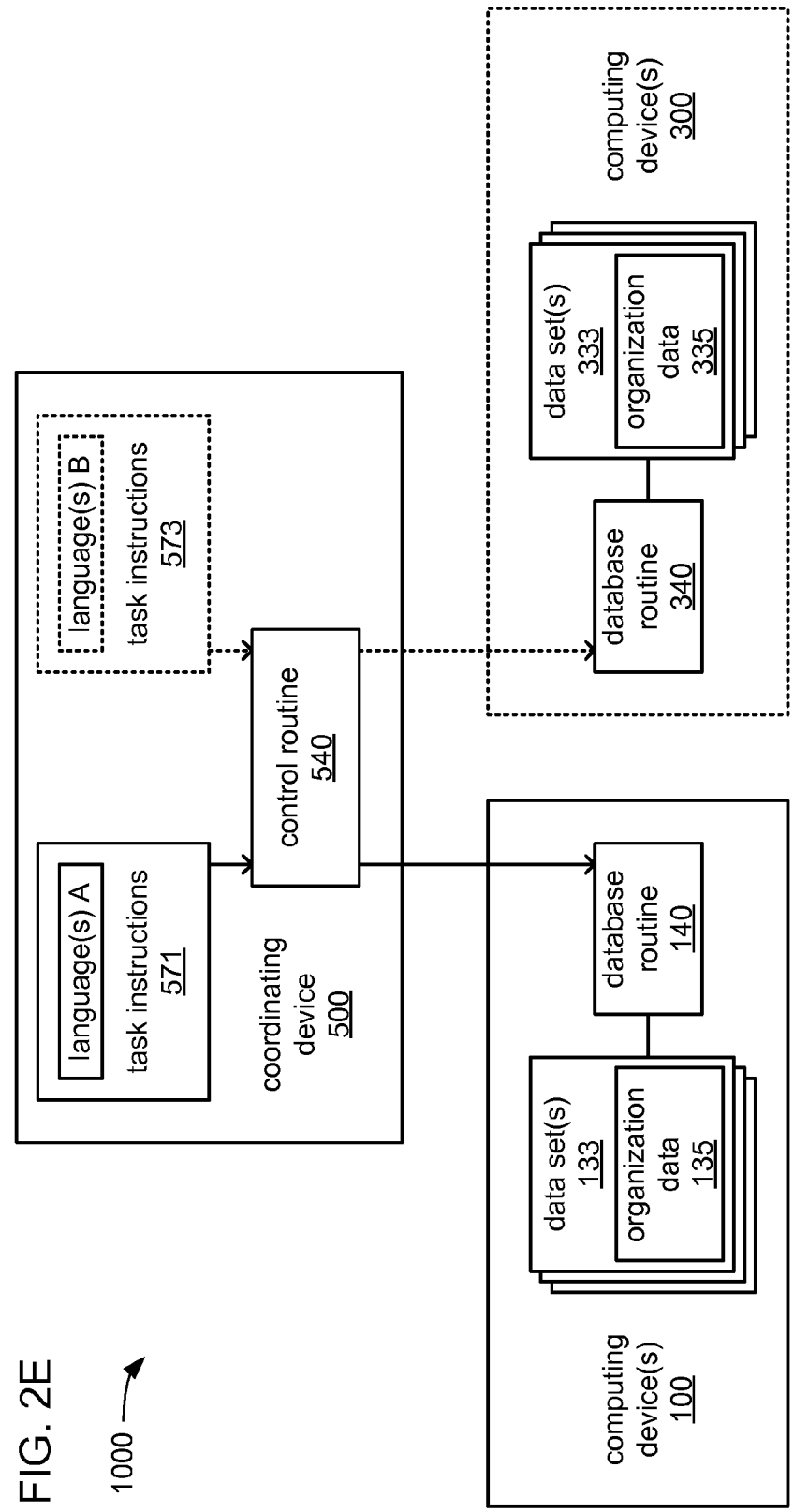
Figure 2F:
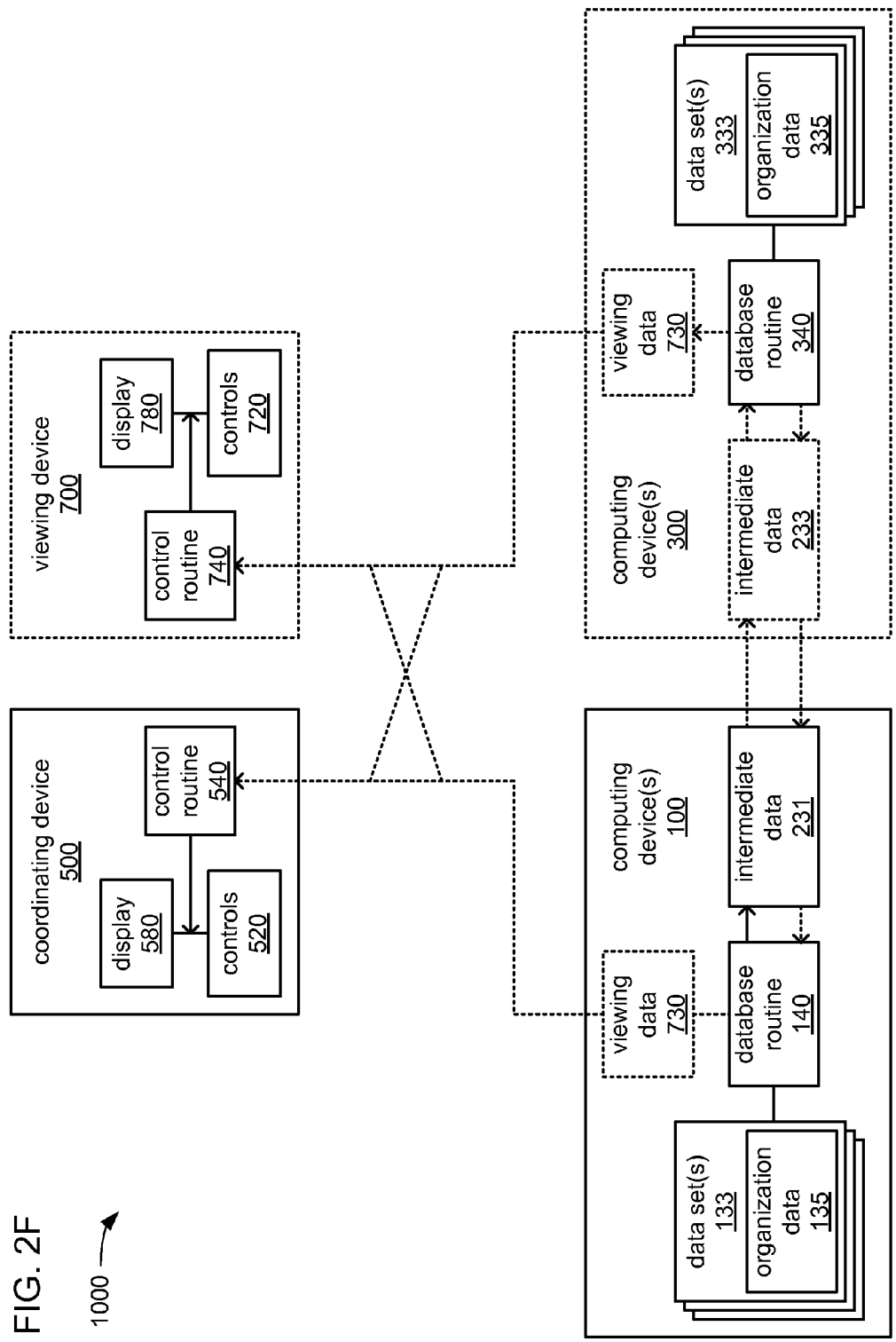

FIGS. 2E and 2F each depict example aspects of performance of the database task following generation of the task instructions 571 and/or 573. Turning to FIG. 2E, the processor component 550 may transmit at least the task instructions 571 to one of the computing devices 100 to be executed to perform at least part of the database task. Further, depending on whether the computing device(s) 100 were selected by the operator to be both source and destination devices, the processor component 550 may transmit the task instructions 573 to one of the computing devices 300. Turning to FIG. 2F, one of the computing devices 100 or 300 may generate the viewing data 730 and may transmit the viewing data 730 to one or both of the coordination device 500 and the viewing device 700 as directed in the instructions generated by the processor component 550.

Returning to FIG. 1, in various embodiments, the viewing device 700 incorporates one or more of a processor component 750, a storage 760, controls 720, a display 780 and a network interface 790 to couple the viewing device 700 to the network 999. The storage 760 may store one or more of a control routine 740 and the viewing data 730. The control routine 740 may incorporate a sequence of instructions operative on the processor component 750 to implement logic to perform various functions. The viewing device 700 may receive the viewing data 730 from one of the computing devices 100 or 300, and in some embodiments, may generate a visualization based on the viewing data 730 to present a depiction of the result of the performance of the database task on the display 780.

In various embodiments, each of the processor components 150, 350, 550 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are linked.

In various embodiments, each of the storages 160, 360, 560 and 760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SO- NOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the network interfaces 190, 390, 590 and 790 may employ any of a wide variety of communications technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1 xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 3A:
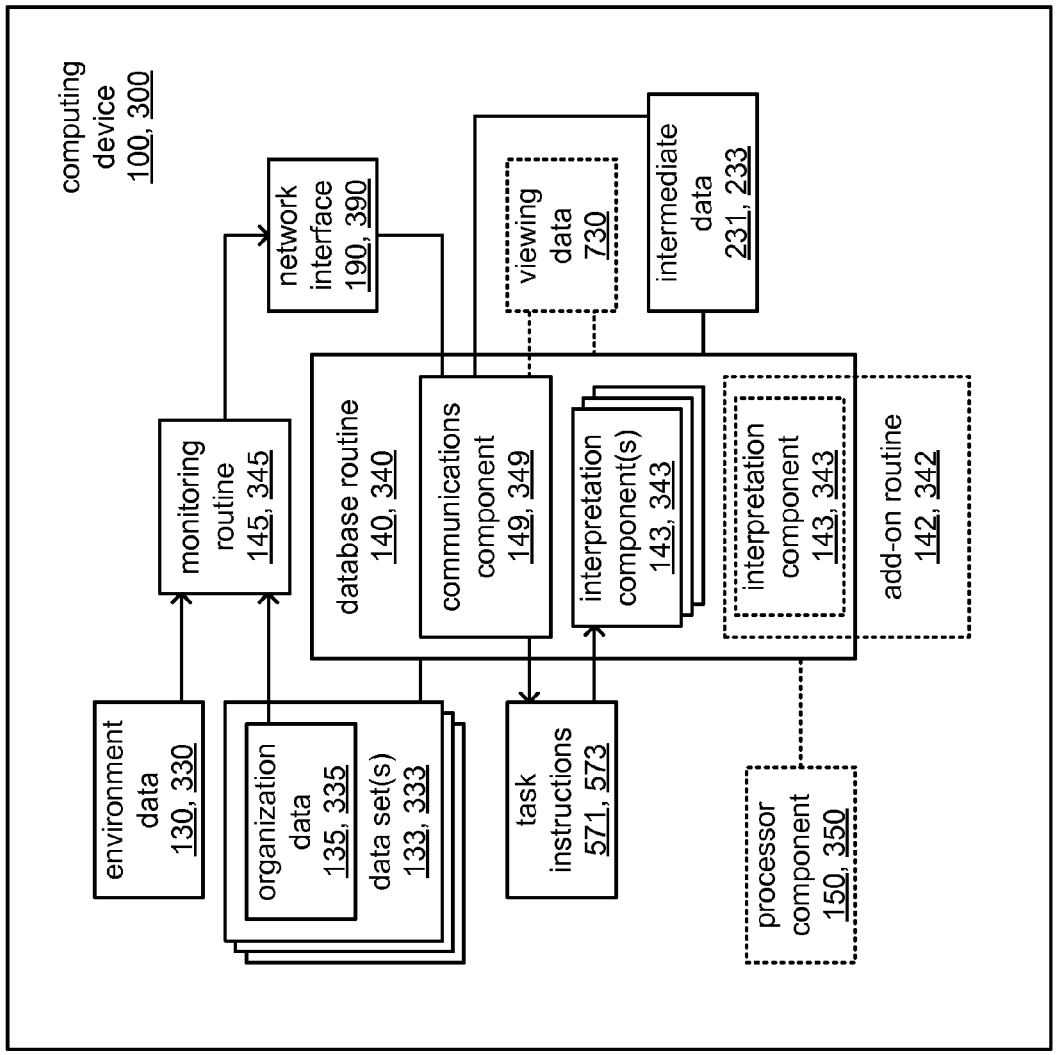
FIGS. 3A and 3B illustrate examples of operating environments for portions of a database query system.
Figure 3B:
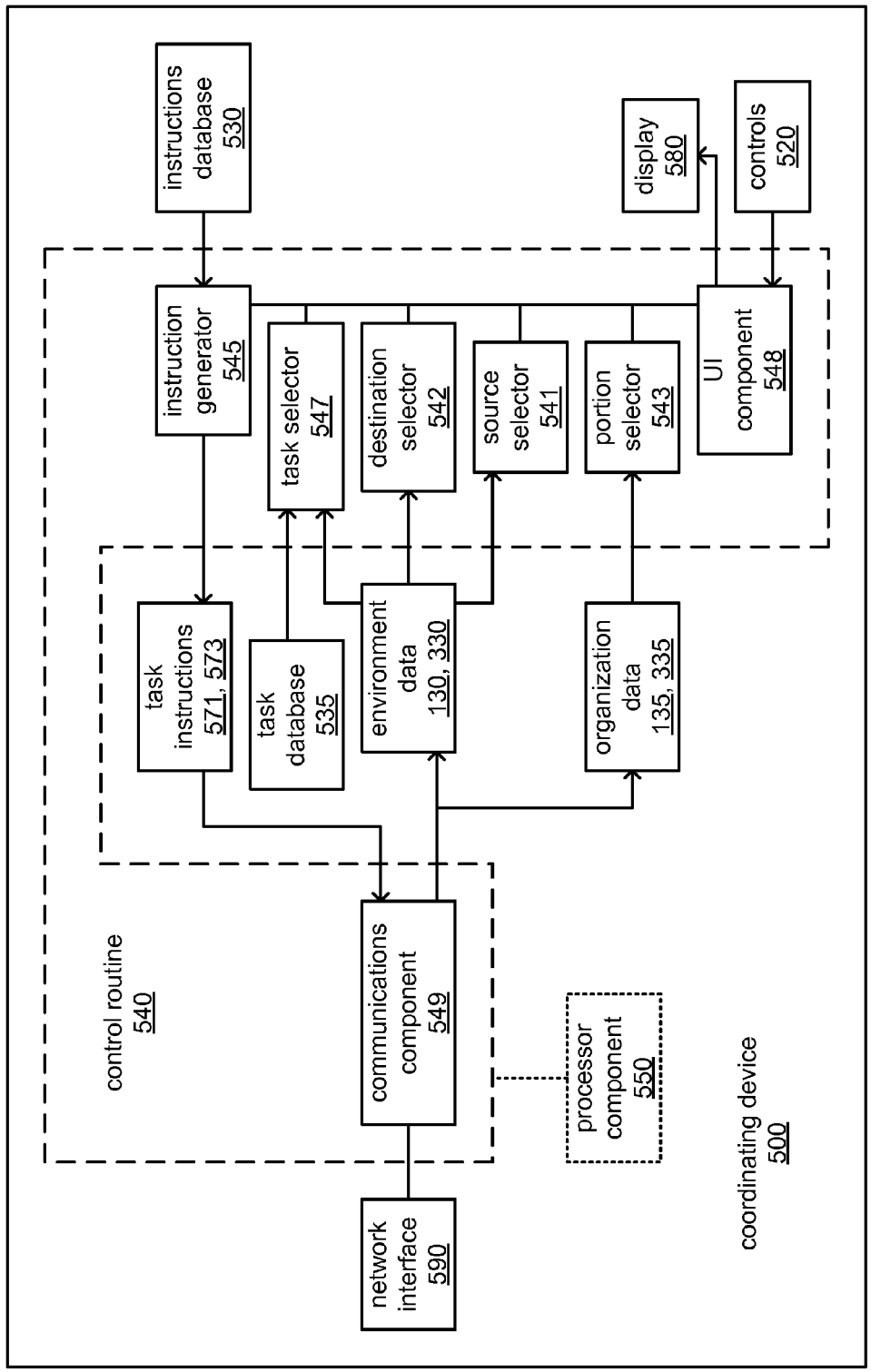

FIGS. 3A and 3B each illustrate a block diagram of a portion of an embodiment of the network analysis system 1000. More specifically, FIG. 3A depicts aspects of the operating environment of an embodiment of either of the computing devices 100 or 300 in which the processor component 150 or 350, in executing the database routine 140 or 340, may execute the task instructions 571 or 573, respectively, generated by the coordinating device 500 to perform at least a portion of a database task. FIG. 3B depicts aspects of the operating environment the computing device 500 in which the processor component 550, in executing the control routine 540, automatically selects one or more database languages supported by one or both of the database routines 140 or 340 to generate the task instructions 571 and/or 573 for execution to perform the database task.

The database routines 140 and 340, and the control routine 540, including the components of which each is composed, are selected to be operative on whatever type of processor or processors that are selected to implement applicable ones of the processor components 150, 350 or 550. In various embodiments, each of the database routines 140 and/or 340, and/or the control routine 540 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 150, 350 or 550. Where one or more device drivers are included, those device drivers may provide support for any of a variety of other components, whether hardware or software components, of corresponding ones of the computing devices 100 or 300, or the coordinating device 500.

Referring to both FIGS. 3A and 3B, the database routines 140 and 340, and the control routine 540 may include the communications component 149, 349 and/or 549 executable by the processor component 150, 350 and/or 550 to operate the network interface 190, 390 and/or 590, respectively, to exchange communications via the network 999 as has been described. Among the communications may be those conveying the environment data 130 and/or 330, the organization data 135 and/or 335, the task instructions 571 and/or 573, the intermediate data 231 and/or 233, and/or the viewing data 730 among the computing devices 100, 300, 500 and/or 700 via the network 999. The communications components 149, 349 and/or 549 may be selected to be operable with whatever type of interface technology is selected to implement the network interfaces 190, 390 and/or 590, respectively.

Turning more specifically to FIG. 3A, the database routines 140 and/or 340 may include one or more interpretation components 143 and/or 343, respectively, to each interpret instructions of the received task instructions 571 and/or 573 as part of the database routines 140 and/or 340 performing those instructions. More specifically, each of the interpretation components 143 or 343 may interpret instructions written in one or more database languages. Further, as depicted, the database routines 140 and/or 340 may be augmented with an additional interpretation component 143 and/or 343 by an add-on routine 142 and/or 342, respectively, to augment the functionality of the database routine 140 and/or 340 with the ability to interpret instructions generated in one or more additional database languages.

Turning more specifically to FIG. 3B, the control routine 540 may include one or more of a user interface (UI) component 548, a devices selector 541, a data selector 543, a task selector 547, and an instruction generator 545. The UI component 548 may cooperate with each of the source selector 541, the destination selector 542, the portion selector 543 and the task selector 547 to present various menus made up of assortments of selectable menu items to guide an operator of the coordinating device 500 through specifying various aspects of a database task to be performed. More specifically, the UI component 548 may operate the display 580 to visually present menus of assortments of items based on information retrieved and/or derived by different ones of the selector components 541, 542, 543 and 547. The UI component 548 may then monitor the controls 520 for indications of manual operation of the controls 520 by the operator to select from among the menu items so presented in each menu.

As previously discussed, the UI component 548 may initially present on the display 580 a menu of selectable menu items that each correspond to a database task that may selected by the operator to be performed. FIG. 4A depicts an example embodiment of such a menu 687 of selectable menu items 627 that each correspond to a database task. As part of presenting the menu 687 on the display 580, the UI component 548 may also present a graphical representation of a pointer 622 that may be operable by the operator in conjunction with the controls 520 to select one of the menu items 627. The UI component 548 may cooperate with the task selector 547 to obtain information concerning the assortment of database tasks to so present as part of the menu 687. The task selector 547 may also obtain graphical images, such as icon images, for each of the database tasks from the task database 535 for use by the UI component 548 in generating the selectable menu items 627. More precisely, each of the menu items 627 may be visually presented as a graphical icon made up of a two-dimensional bitmap image. The UI component 548 may then monitor the controls 520 for an indication of manual operation thereof by the operator to select one of the menu items 627 to indicate a selection by the operator of the database task that corresponds to that selected menu item 627.

Figure 4B:
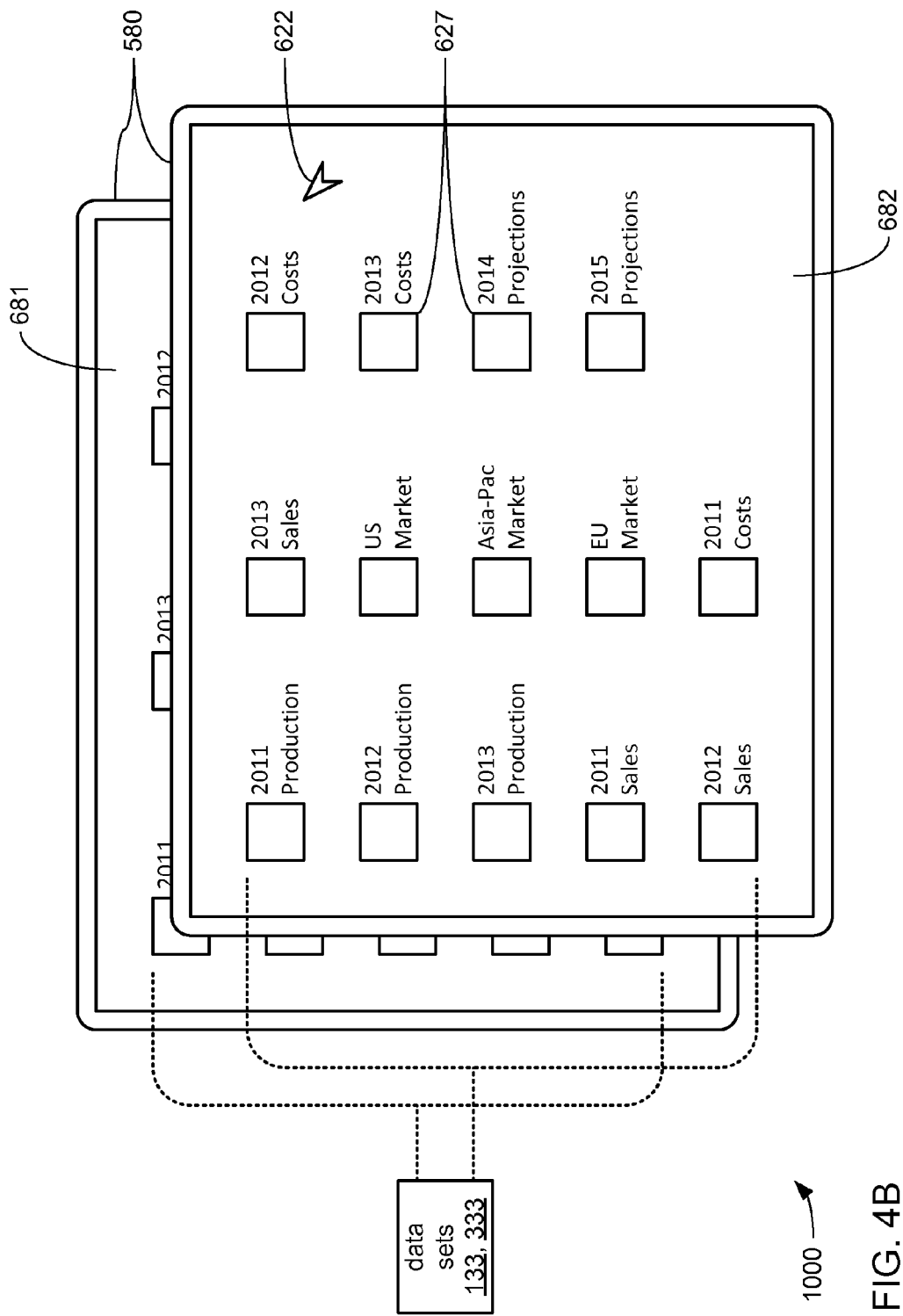

The UI component 548 may then present on the display 580 menu(s) of selectable menu items that each correspond to devices and/or data sets that may be selected by the operator to serve as a source and/or as a destination in the performance of the database task. FIG. 4B depicts an example embodiment of such menus 681 and 682 of selectable menu items 627 that each correspond to a device and/or a data set selectable to serve as a source and/or as a destination. The UI component 548 may cooperate with the source selector 541 and/or the destination selector 542 to obtain information concerning what devices and/or data sets are available to include in the assortments thereof that are so presented as part of each of the menus 681 and 682. The task selector 547 may also obtain graphical images, such as icon images, for each of the database tasks from the task database 535 for use by the UI component 548 in generating the selectable menu items 627. The UI component 548 may then monitor the controls 520 for an indication of manual operation thereof by the operator to select one of the menu items 627 in each of the menus 681 and 682 to indicate selections of the source and destination, respectively, that correspond to those selected menu items 627.

The UI component 548 may also present on the display 580 one or more menu(s) of selectable menu items that each correspond to larger or smaller portions of a data set earlier selected by the operator as a source or as a destination in the performance of the database task. FIG. 4C depicts an example embodiment of a pair of such menus 683 of selectable menu items 623 and 625 that each correspond to a selection of more or less of a data set earlier selected by the operator to serve as a source and/or as a destination. The UI component 548 may cooperate with the portion selector 543 to obtain information concerning the organization of selected one(s) of the data sets 133 and/or 333 that are available to include in the assortments thereof that are so presented as part of each of the menus 681 and 682. Unlike the menu items 627 of the earlier depicted example menus, the assortments of portions of data sets are presented in each of the menus 683 as alternately selectable menu items 625 (often referred to as "radio buttons") and/or as expandable menus of selectable menu items 623 (often referred to as "drop down" or "pull down" menus). The UI component 548 may then monitor the controls 520 for an indication of manual operation thereof by the operator to select one or more of the menu items 623 and/or 625 to indicate corresponding selections of portion(s) of the earlier specified source and destination by the operator.

The UI component 548 may further present on the display 580 one or more menu(s) of selectable menu items that each correspond to operations to perform on one or more portions of an earlier selected data set as part of performing the database task. FIG. 4D depicts an example embodiment of such a menu 686 of selectable menu items 623 that each correspond to a selection of more or less of an earlier selected data set and/or an operation to perform thereon. The UI component 548 may cooperate with both the portion selector 543 and the task selector 547 to obtain information concerning the organization of selected one(s) of the data sets 133 and/or 333, as well as information concerning assortments of operations that may be performed as part of the earlier selected database task to present as part of the menu 686. As depicted, the assortments of portions of data sets and assortments of operations in the menu 686 may be presented as selectable menu items 623 in drop down or pull down menus. The UI component 548 may then monitor the controls 520 for an indication of manual operation thereof by the operator to select one or more of the menu items 623 to indicate selections of operations and of portion(s) of the earlier selected portions of a data set on which to perform those selected operations.

Returning to FIG. 3B, following reception of indications of selections by the operator of the coordinating device 500 by the UI component 548, the instruction generator 545 employs those indications of selections, along with the earlier described information stored as part of the instructions database 530, to automatically generate instructions for performing the database task. More specifically, and as earlier described in greater detail, the instruction generator 545 determines what database languages are supported by the database routines 140 and/or 340, automatically selects one or more database languages in which to generate the task instructions 571 and/or 573, and then so generates the task instructions 571 and/or 573.

Figure 5A:
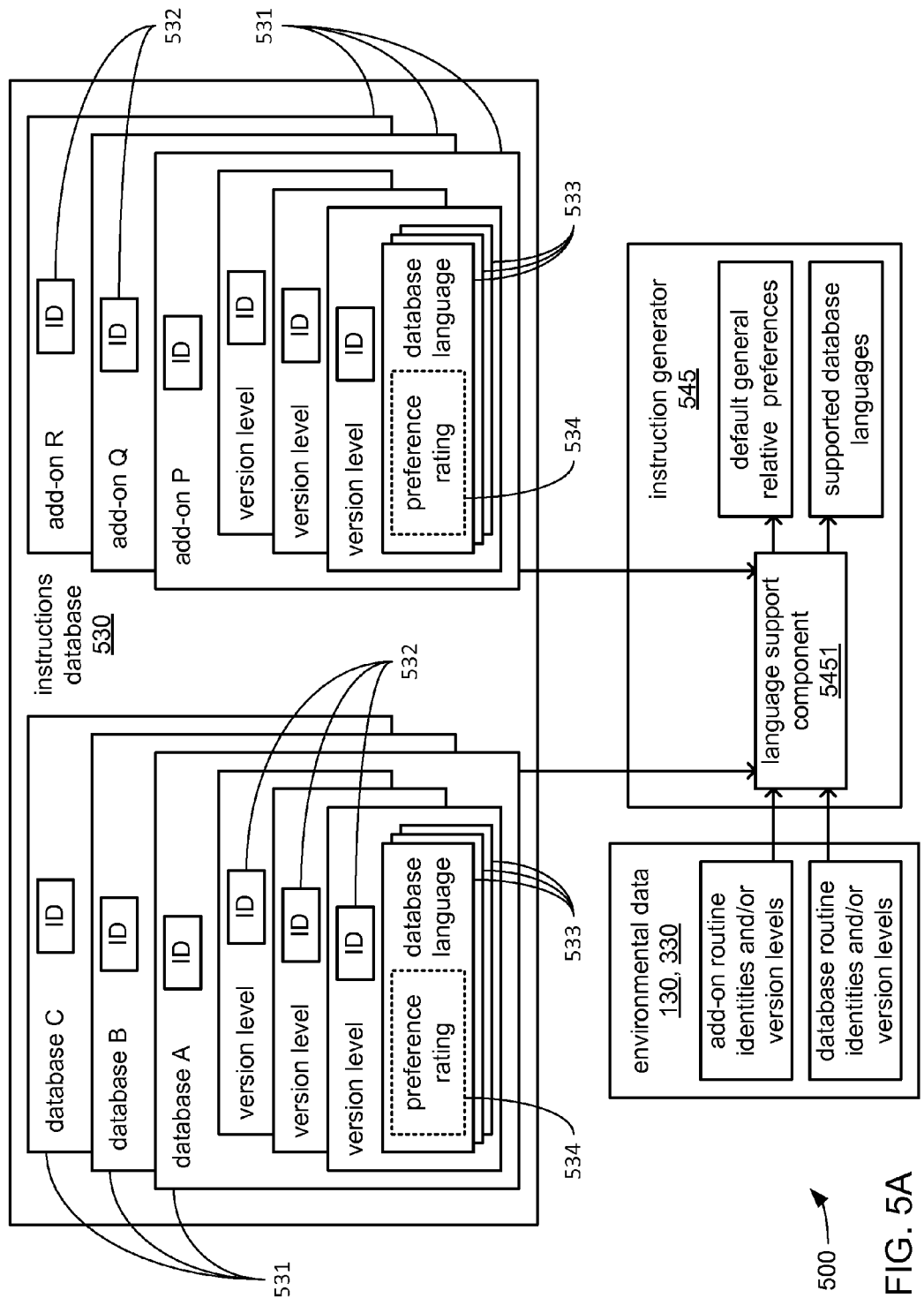
FIGS. 5A, 5B and 5C, together, illustrate an example of an operating environment for a coordinating device of a database query system.
Figure 5B:
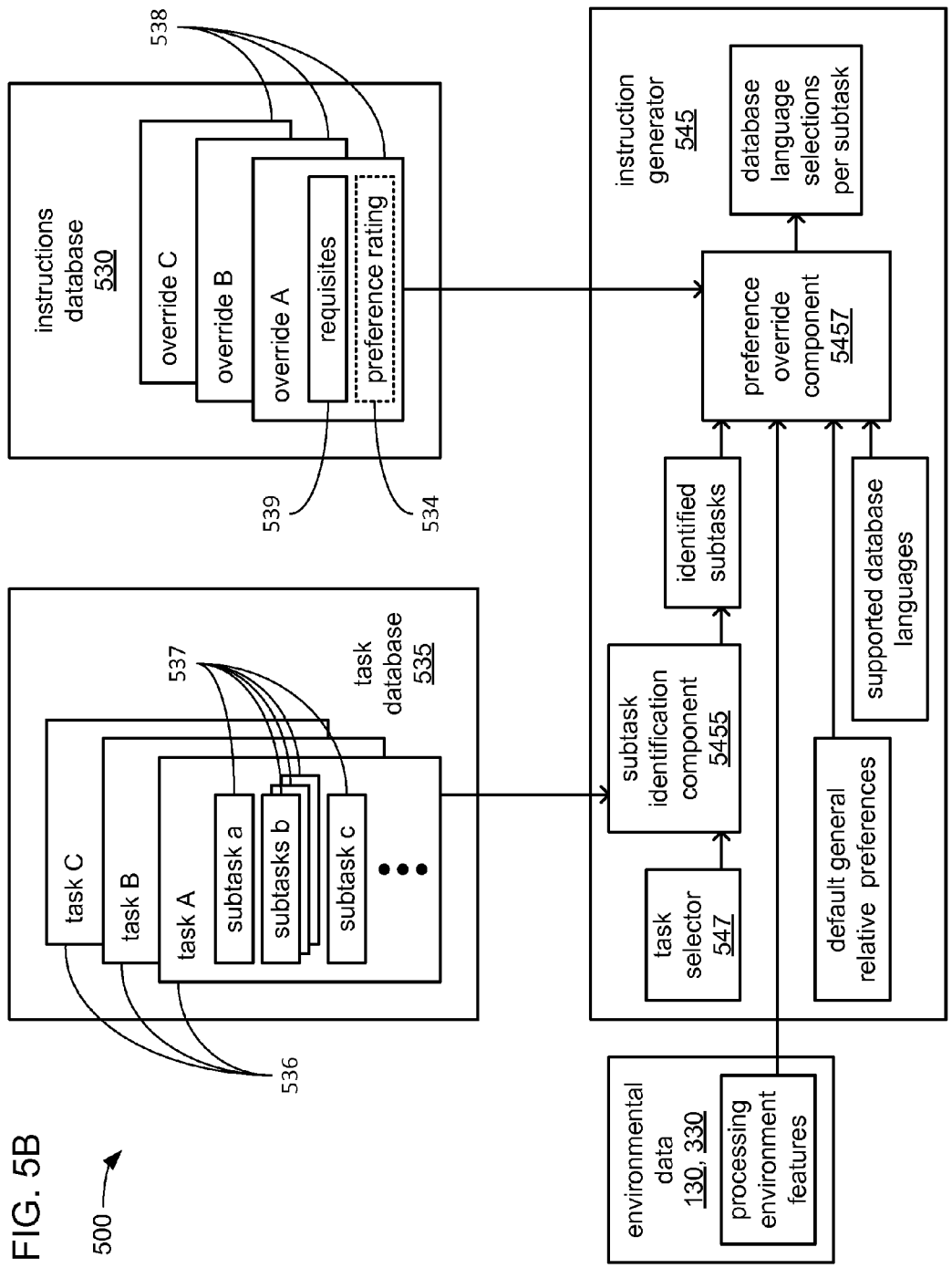
Figure 5C:
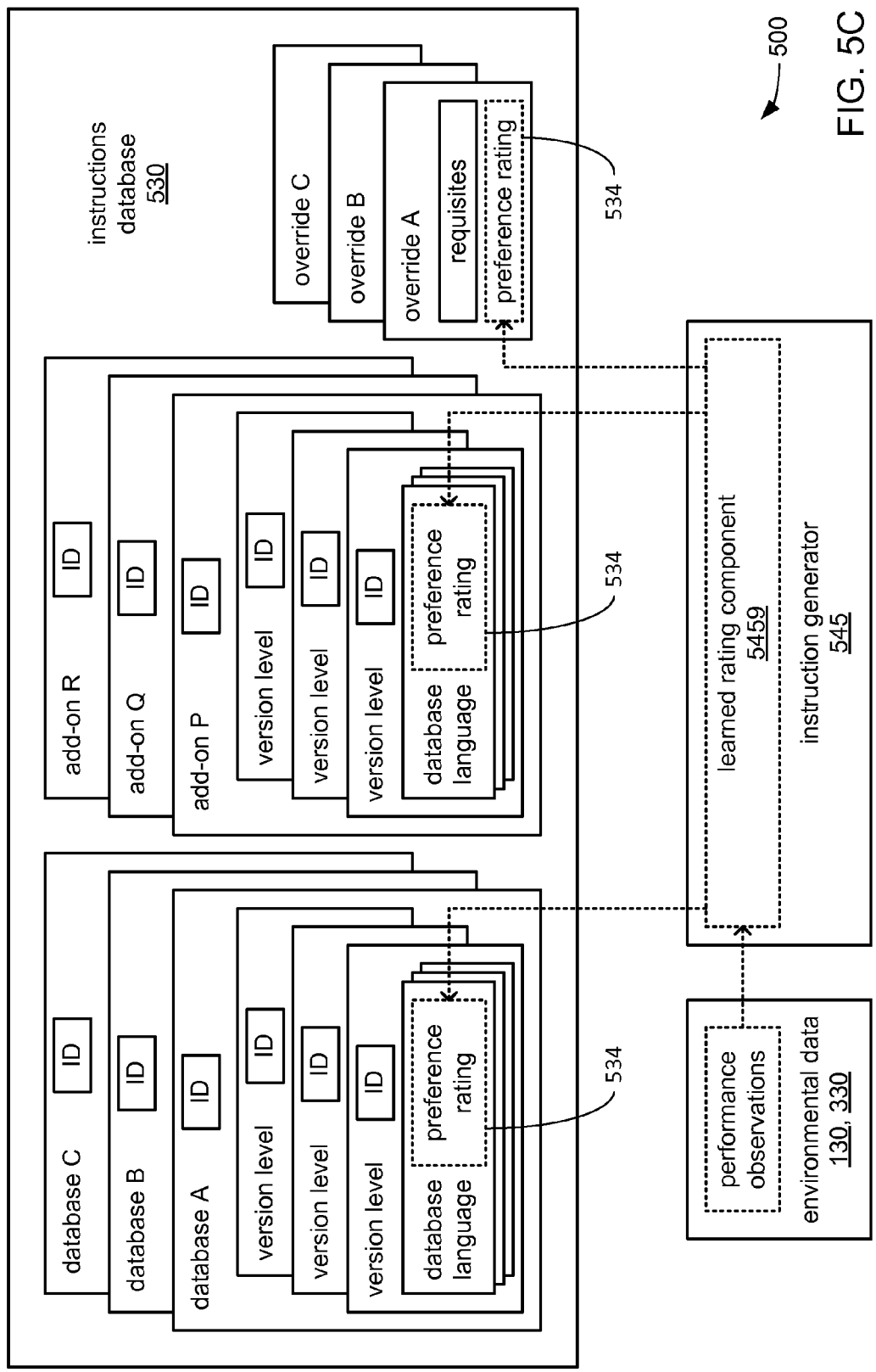

FIGS. 5A, 5B and 5C, together, depict an example embodiment of automatic selection of database language for subtasks of the database task specified by the operator. FIG. 5A depicts an example of identification of one or more database languages supported by a database routine and/or an add-on routine by which the database routine may be augmented. FIG. 5B depicts an example of derivation of relative preferences of different ones of the supported database languages for each subtask of the database task. FIG. 5C depicts an example of updating stored ratings reflecting relative preferences among database languages based on observations of performance arising from the use of various different database languages over time.

Turning to FIG. 5A and as depicted, the instructions database 530 may include a data structure (e.g., an array or linked-list) made up of entries 531 that may each correspond to a database routine that may be identified as being the database routine 140 of one or more of the computing devices 100 and/or the database routine 340 of one or more of the computing devices 300. Similarly, the instructions database 530 may include a similar data structure made up of entries 531 that may each correspond to an add-on routine that may be identified as being one of the add-on routine(s) 142 (if any are present) of one or more of the computing devices 100 and/or one of the add-on routine(s) 342 (if any are present) of one or more of the computing devices 300.

Within each entry 531 for a database routines and/or an add-on routines may be one or more sub-entries 532 that may each correspond to a version level of one of the database or add-on routines. Within each sub-entry 532 may be indications 533 of one or more database languages supported by the corresponding version level of the corresponding database routine or add-on routine. Each such indication 533 may, in addition to specifying a supported database language, may also specify a default rating of preference for using that supported database language relative to other database languages. These ratings may have been derived through various forms of experimentation with the use of different database languages under a range of conditions to determine their general relative levels of performance across range of data operations expected to be included in the performance of various expected database tasks.

A language support component 5451 of the instruction generator 545 may match indications of the identity and version level of the database routines 140 and/or 340 from within the environment data 130 and/or 330, respectively, to identifiers in each of the entries 531 and sub-entries 532 thereof. Similarly, the language support component 5451 may match indications of the identity and version level of any add-on routines 142 that may accompany the database routine 140 and/or of any the add-on routines 342 that may accompany the database routine 340 from within the environment data 130 and/or 330, respectively, to identifiers in each of the entries 531 and sub-entries 532 thereof. Upon identifying the database routines 140 and/or 340 and any accompanying add-on routines 142 and/or 342, the language support component 5451 may retrieve indications of what database languages are supported by the database routines 140 and/or 340, as well as by any add-on routines 142 and/or 342 that may be employed to augment the database languages supported by the database routines 140 and/or 340, respectively. The language support component 5451 may similarly retrieve indications of default general relative preferences indicative of which of the database languages supported by the database routines 140 and/or 340 are generally preferred to be used in generating instructions for all subtasks as a default in lieu of any more specific information associated with the use of database languages for any one particular subtask.

Turning to FIG. 5B and as depicted, the instructions database 530 may include another data structure made up of entries 536 that may each correspond to one of the database tasks that may have been included in the assortment of database tasks presented to enable selection of the database task to be performed by the operator of the coordinating device 500. Within each entry 536 for a database task may be one or more sub-entries 537 that may each correspond to a subtask that may make up that database task. As depicted, there may be multiple variations of a subtask (e.g., the depicted subtask B) from which one may be automatically selected based on what mathematical or logical operations the operator of the coordinating device 500 may have selected in response to an automated prompt to make such a selection. Such variations may, by way of example, include a selection of comparisons between data values with action taken if those data values are equal, not equal, and/or one is less than or greater than the other.

A subtask identification component 5455 of the instruction generator 545 may receive an indication from the task selector 547 of what database task was selected by the operator of the coordinating device 500 to use in retrieving indications from a corresponding one of the entries 536 of what subtasks may be performed in the performance of the database task. The subtask identification component 5455 may then employ the indications of subtasks that may be performed and the indications from the task selector 547 of the operations selected to be performed to identify the specific subtasks that are to be performed during the performance of the selected database task.

Continuing with FIG. 5B and as also depicted, the instructions database 530 may include a further data structure made up of entries 538 that may each correspond to a situation in which one of the default general relative levels of preference for using a particular one of the supported database languages may be overridden such that a different one of the supported database languages may be automatically selected for a particular subtask. Within each entry 538 for an override may be indications of one or more conditions that must be met to cause the corresponding override of a database language preferred for use by default to be overridden by the selection of a different database language for a particular subtask. Also within each entry 538 may be an indication of a preference rating 534 for using the other database language in response to the indicated conditions having been met.

The indicated conditions may include an indication that the override applies to only one or more particular subtasks such that the override is not triggered if none of those particular one or more subtasks are being performed as part of performing the database task. The indicated conditions may also include an indication that a particular database language must be supported by the one of the database routines 140 and/or 340 that is to perform a subtask to which the override applies. The indicated conditions may further include one or more features of a processor component, storage device, computing device node, etc. that must be indicated in the environment data 130 and/or 330 as available for use for the override to be triggered.

The indications of a preference rating 534 similar to those within the entries 531 may serve to limit the triggering of the override to using a different database language from a database language that may be used based on a general default relative preference if that database language so preferred by default has a preference rating that is less than that of the other database language that is associated with the override. In this way, an override to use another database language may not be taken if the database language associated with that override is less preferred than the database language that is already indicated as preferred by default.

A preference override component 5457 of the instruction generator 545 may examine each subtask identified as part of the database task and indications of what processing environment features are indicated as available in the environment data 130 and/or 330 to examine the entries 538 for an override that may apply to one or more of the identified subtasks. For each subtask, where the conditions to trigger an override are met and the database language associated with that override is indicated as having a higher level of preference for use for that subtask under those conditions than the database language that is indicated as the preferred one of the supported database languages by default, the preference override component 5457 may automatically select the database language associated with that override to be used in generating the instructions for that subtask. Otherwise, for each subtask for which no override is triggered, the preference override component 5457 may automatically selected the one of the supported database languages indicated as preferred by default to be the database language to be used in generating the instructions for that subtask.

Turning to FIG. 5C, as previously discussed, the monitoring routines 145 and/or 345 may include indications of levels of performance achieved by the performance of different operations using different supported database languages observed over a period of time within the environment data 130 and/or 330, respectively. A learned rating component 5459 of the instruction generator 545 may retrieve such indications from each instance of the environment data 130 and/or 330, and may analyze such indications to determine whether the indications of relative levels of preference for each database language indicated in the preference ratings 534 continue to hold true for a particular embodiment of the database system 1000. Where, after a sufficient sampling of observations has been collected, the levels of performance observed among the supported database languages reveal that the default indications of preference of one database language over another in the preference ratings 534 need to be adjusted, the learned rating component 5459 may augment the default indications of preference within one or more of the preference ratings 534 with a learned preference rating and/or a modifier of the weight given to the default preference ratings. In this way, over time, the preference ratings 534 are adjusted to better align with the observations of actual performances of database tasks.

Figure 6:
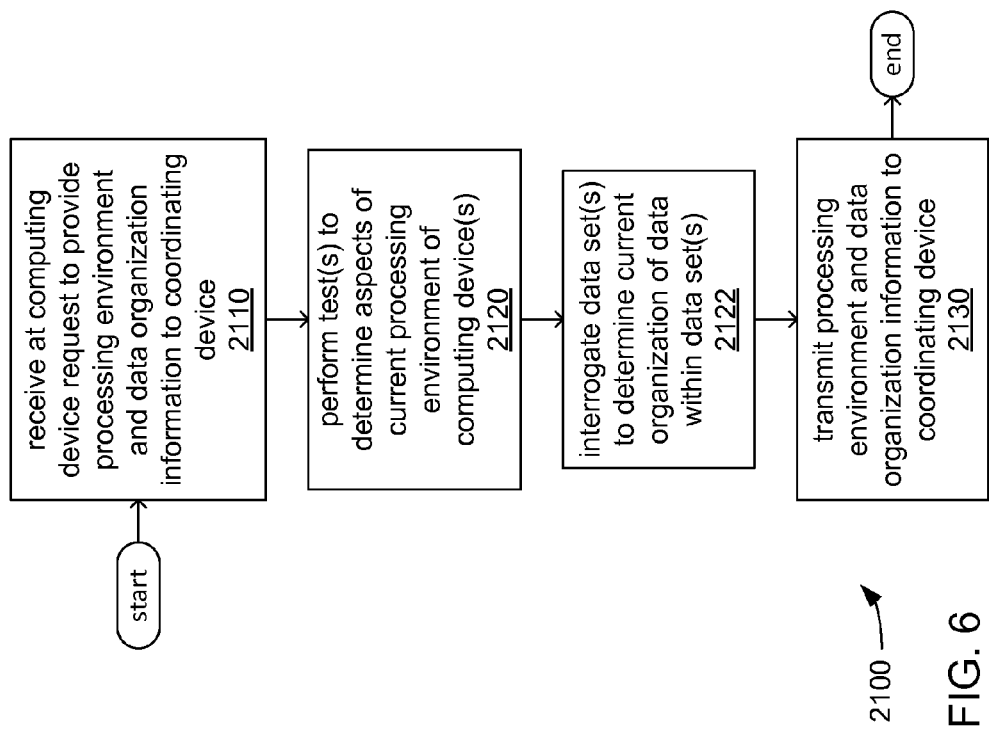
FIG. 6 illustrates an example embodiment of a logic flow of generating and performing task instructions in a database query system.

FIG. 6 illustrates an example embodiment of a logic flow 2100. The logic flow 2100 may be representative of some or all of the operations executed by one or more embodiments described herein. More specifically, the logic flow 2100 may illustrate operations performed by the processor components 150 and/or 350 in executing the monitoring routines 145 and/or 345, and/or performed by other component(s) of at least the computing devices 100 and/or 300, respectively.

At 2110, a processor component of a computing device (e.g., the processor component 150 or 350 of the computing device 100 or 300, respectively) may receive via a network a request from a coordinating device (e.g., the coordinating device 500 via the network 999) to provide processing environment and/or data organization information to the coordinating device. As previously discussed, such requests may be transmitted by the coordinating device to one or more computing devices in response to an operator of the coordinating device specifying at least source and/or destination device(s) for a database task, if not also specifying source and/or destination data set(s).

At 2120, the processor component may perform one or more tests and/or make one or more queries of various hardware and/or software components of the computing device to determine aspects of its processing environment, and may store indications of those aspects as part of environment data able to be transmitted to the coordinating device. At 2130, the processor component may also interrogate one or more data sets found to be present within the computing device (e.g., one or more of the data sets 133 and/or 333) to determine the manner in which data is organized within each. As has been discussed, within each of the data sets may be organization data concerning rows, columns and/or other dimensional ordering of data values, as well as indications of data types for the data values, and a database query may be employed to retrieve such information from at least the ones of the data sets that are selected by the operator for use in the database task.

At 2140, the processor component may then transmit the environment data and/or the organization data to the coordinating device via the network. As has been discussed, the coordinating device may then employ the environment data and/or the organization data to automatically select database language(s) in which to generate task instructions that the coordinating device may then transmit to the computing device for execution to cause at least partial performance of a database task.

Figure 7:
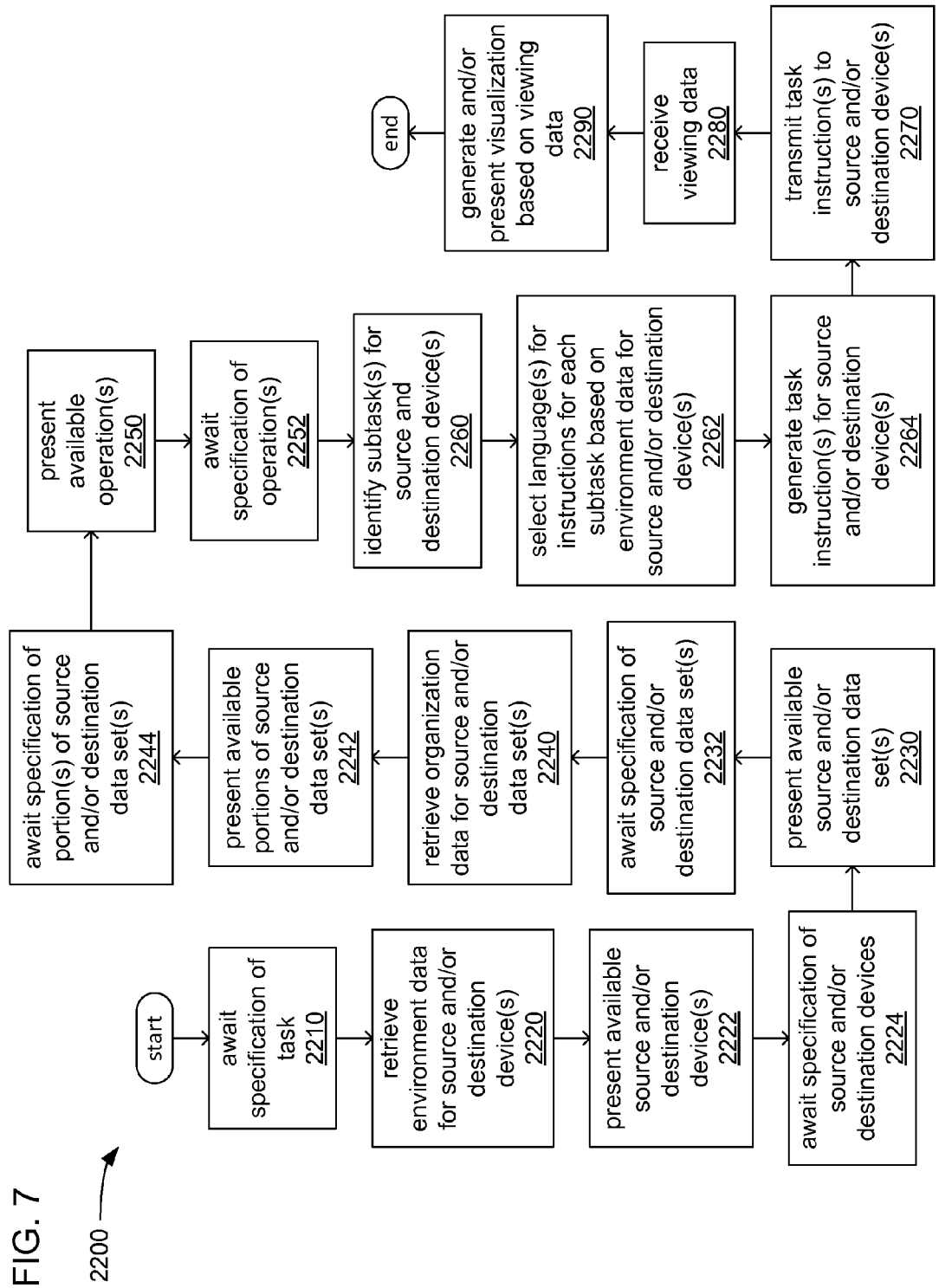
FIG. 7 illustrates another example embodiment of a logic flow of generating and performing task instructions.

FIG. 7 illustrates an example embodiment of a logic flow 2200. The logic flow 2200 may be representative of some or all of the operations executed by one or more embodiments described herein. More specifically, the logic flow 2200 may illustrate operations performed by the processor component 550 in executing the control routine 540, and/or performed by other component(s) of at least the coordinating device 500.

At 2210, a processor component of a coordinating device (e.g., the processor component 550 of the coordinating device 500) may await receipt of an indication of an operator of the coordinating device specifying a database task to perform. As has been discussed, processor component may present an assortment of database tasks to the operator on the display to prompt the operator to select from among those.

At 2220, the processor component may transmit request(s) via a network to one or more computing devices (e.g., one or more of the computing devices 100 and/or 300 via the network 999) to provide environment data (e.g., the environment data 130 and/or 330). At 2222, upon receipt of the request for environment data, the processor component may present an assortment of those computing devices on the display with a prompt for the operator to select source and/or destination devices from among the assortment, and the processor component may await indications of selection of source and/or destination devices at 2224 by the operator.

At 2230, the processor component may present an assortment of those computing devices on the display with a prompt for the operator to select source and/or destination devices from among the assortment. As has been discussed, indications of what data sets are available within a computing device (e.g., the data sets 133 and/or 333) may be included within the environment data retrieved from that computing device. At 2232, the processor component may await indications of selection of source and/or destination data sets.

At 2240, the processor component may transmit request(s) via the network to the one or more computing devices that may be selected as the source and/or destination for the database task organization data (e.g., the organization data 135 and/or 335) indicating the manner in which data is organized within the selected data set(s). At 2242, upon receipt of the request for organization data, the processor component may present an assortment of portions of the selected data set(s) on the display with a prompt for the operator to select the portion(s) of the source and/or destination data set(s) from among the assortment, and the processor component may await indications of selection of portion(s) by the operator at 2244.

At 2250, the processor component may present an assortment of operations that may be performed on selected portions of the selected data set(s) on the display with a prompt for the operator to select one or more operations to be performed from among the assortment. As has been discussed, indications of what data operations may be performed in the performance of the database task may be included within a task database maintained by the coordinating device. At 2252, the processor component may await indications of selection of one or more operations.

At 2260, the processor component may employ the selection by the operator of database task and/or operations to be performed as part of the database task to determine the one or more subtasks that make up the database task. As has been explained, where the source and destination devices are not one and the same, different subtasks may be identified for each of those devices. At 2262, the processor component may employ the environment data retrieve from the source and/or destination devices to automatically select database languages for each subtask. As has been discussed, the processor component may first determine what database languages are supported by the database routines of the source and/or destination devices, and may then employ other indications of other aspects of the processing environments of each device to automatically select one or more database languages from among the supported database languages. At 2264, the processor component may generate the task instructions for the source and/or destination devices.

At 2270, the processor component may transmit the task instructions to the source and/or destination devices via the network for execution thereby to perform the database task. At 2280, the processor component may receive viewing data and/or other data indicative of the results of the performance of the database task, and may generate and/or present a visualization based on such received data at 2290.

Figure 8:
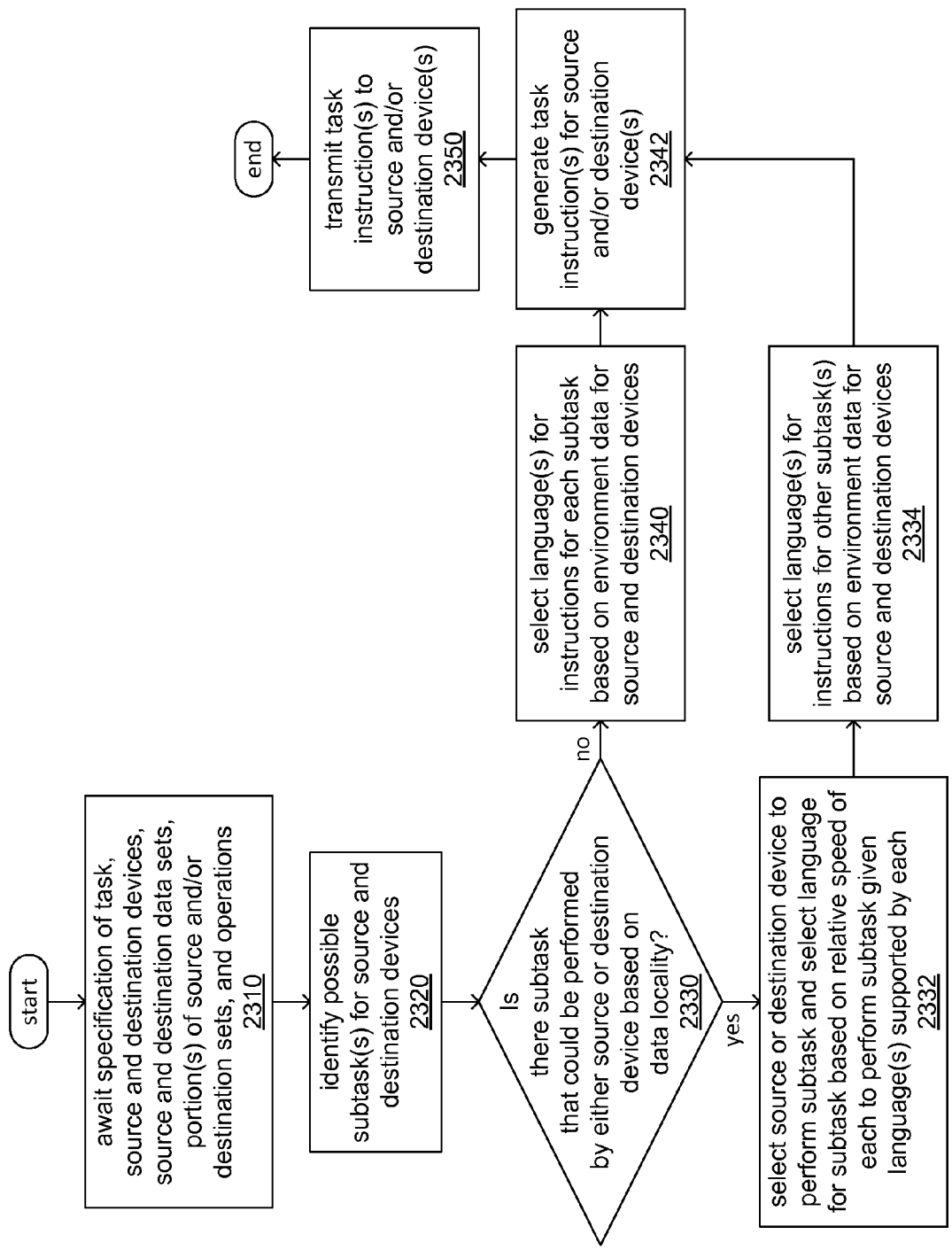
FIG. 8 illustrates an example embodiment of a logic flow of generating task instructions.

FIG. 8 illustrates an example embodiment of a logic flow 2300. The logic flow 2300 may be representative of some or all of the operations executed by one or more embodiments described herein. More specifically, the logic flow 2300 may illustrate operations performed by the processor component 550 in executing the control routine 540, and/or performed by other component(s) of at least the coordinating device 500 in an embodiment in which the source and destination devices may be not be one and the same.

At 2310, a processor component of a coordinating device (e.g., the processor component 550 of the coordinating device 500) may await receipt of an indication of an operator of the coordinating device specifying a database task to perform. At 2320, from at least the specification of the database task, the processor component may then identify the subtasks to be performed as part of performing the database task.

At 2330, a check is made as to whether there is a subtask that could be performed by either the source device or the destination device, depending on the locality of at least a portion of data associated with the database task (e.g., data of the source data set, data of the destination data set or data derived amidst performance of the database task). As previously discussed, as part of the performance of a database task, there may be a transfer of data between source and destination devices, and this may afford an opportunity to perform a subtask involving that data either within the source or destination devices.

If, at 2330, there is no such subtask, then the processor component may automatically select, for each subtask, a database language in which to generate instructions for the performance of that subtask at 2340. Following such automatic selections of database language for each subtask, the processor component may then generate the task instructions for each of the source and destination devices at 2342, and may then transmit the generated task instructions to the source and destination devices at 2350.

However, if at 2330, there is such a subtask, then the processor component may determine which of the source and destination devices are to perform the subtask and the database language in which to generate instructions for performing that subtask at 2332 based on relative speeds at which that subtask is able to be performed by either device. The processor component may then automatically select database languages in which to generate the instructions for the performance of each of the other subtasks by respective ones of the source and destination devices at 2334, before generating the task instructions for each of the source and destination devices at 2342.

Figure 9:
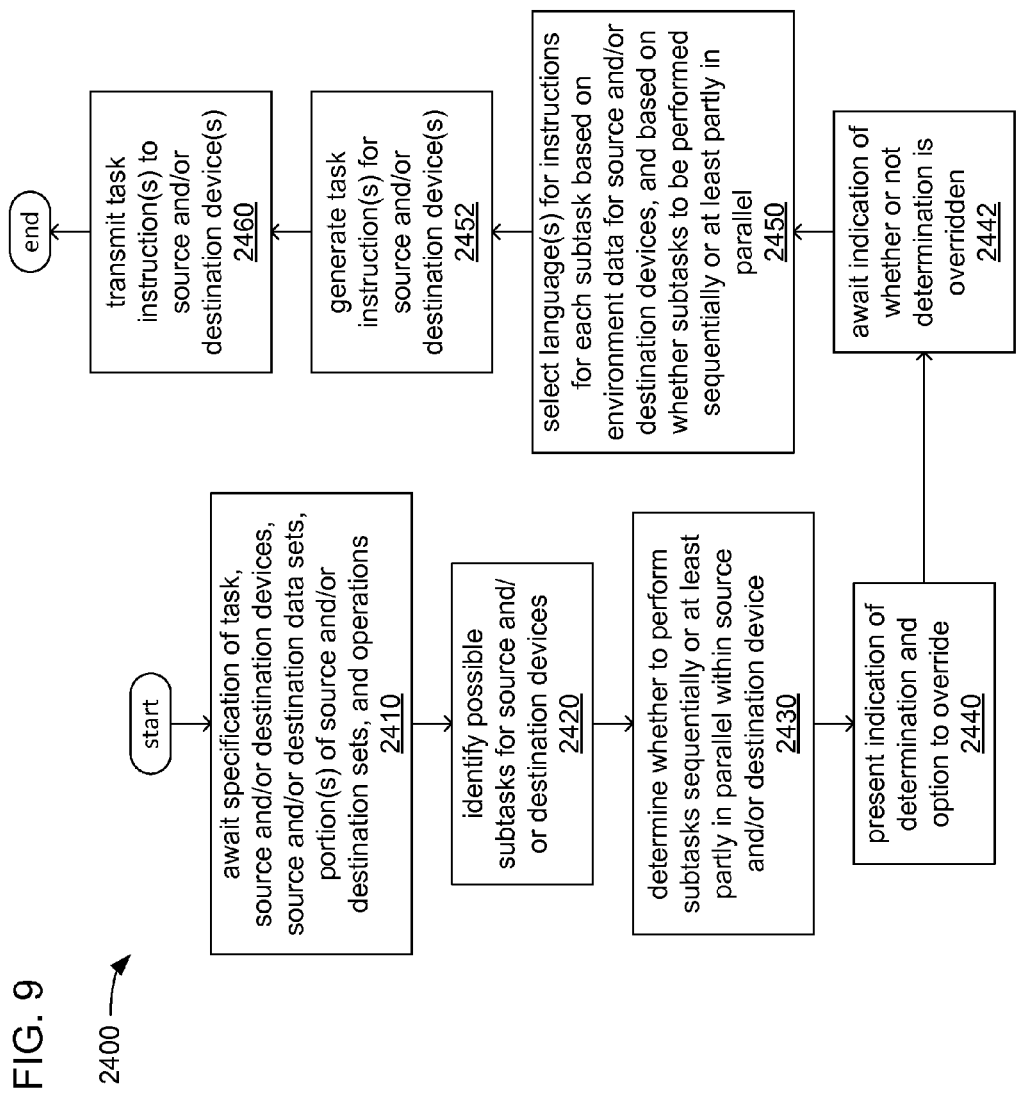
FIG. 9 illustrates another example embodiment of a logic flow of generating task instructions.

FIG. 9 illustrates an example embodiment of a logic flow 2400. The logic flow 2400 may be representative of some or all of the operations executed by one or more embodiments described herein. More specifically, the logic flow 2400 may illustrate operations performed by the processor component 550 in executing the control routine 540, and/or performed by other component(s) of at least the coordinating device 500 in an embodiment in which at least one of the source and destination devices may be implemented as a cluster of computing device nodes.

At 2410, a processor component of a coordinating device (e.g., the processor component 550 of the coordinating device 500) may await receipt of an indication of an operator of the coordinating device specifying a database task to perform. At 2420, from at least the specification of the database task, the processor component may then identify the subtasks to be performed as part of performing the database task.

At 2430, the processor component may determine whether to perform one or more subtasks within one of the source or destination devices sequentially or at least partially in parallel. As has been discussed, the source device and/or the destination device may be made up of a cluster of multiple computing device nodes, or the source and/or destination device may employ a processor component capable of supporting multiple numerous simultaneous threads of execution. At 2440, the processor component may present an operator of the coordinating device with the results of this determination on a display as a proposed selection along with a prompt to either accept this proposed selection or to override it, and the processor component may await an indication of whether the operator has chosen to accept or change it at 2442.

At 2450, the processor component may automatically select one or more database languages in which to generate instructions for the performance of each subtask based, at least in part, on whether there are subtasks to be executed at least partially in parallel as a result of the determination made by the processor component and/or an override of the results of that determination by the operator. In so doing, the processor component may also base the automatic selection of database languages for the performance of each subtask on aspects of the processing environments of the source and/or destination devices, in addition to the question of whether there are subtasks to be executed sequentially or at least partially in parallel.

At 2452, the processor component may so generate the instructions for the source and/or destination devices to perform the database task. At 2460, the processor component may transmit the generated instructions to the source and/or destination devices.

Figure 10:
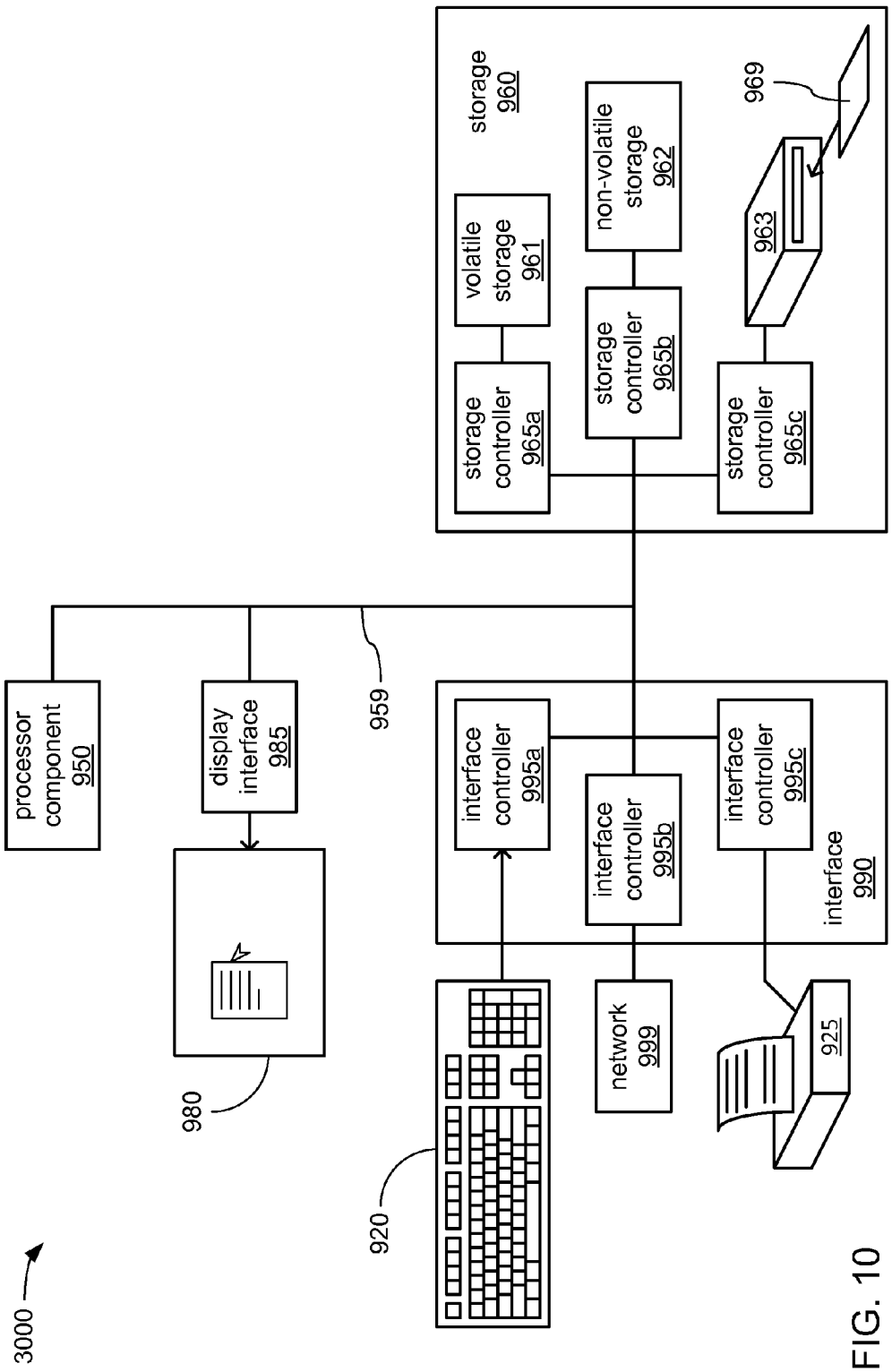
FIG. 10 illustrates an example embodiment of a processing architecture.

FIG. 10 illustrates an example embodiment of a processing architecture 3000 suitable for implementing various embodiments as previously described. More specifically, the processing architecture 3000 (or variants thereof) may be implemented as part of one or more of the computing devices 100, 300, 500 or 700. It should be noted that components of the processing architecture 3000 are given reference numbers in which the last two digits correspond to the last two digits of reference numbers of at least some of the components earlier depicted and described as part of the computing devices 100, 300, 500 and 700. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information over the communications media. The information can be implemented as transmissions allocated to one or more electrical and/or optical conductors. A message (including a command, status, address or data message) may be one of such transmissions or may be a plurality of such transmissions, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a touch screen 980 incorporating a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which commands and/or data are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to one or more of the processor components 150, 350, 550 and 750) may include any of a wide variety of commercially available processors, employing any of a wide variety of technologies and implemented with one or more cores physically combined in any of a number of ways.

As previously discussed, the storage 960 (corresponding to one or more of the storages 160, 360, 560 and 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as including multiple distinct types of storage is in recognition of the commonplace use of more than one type of storage device in computing devices in which one type provides relatively rapid reading and writing capabilities enabling more rapid manipulation of data by the processor component 950 (but in which a "volatile" technology may be used constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969. The machine-readable storage medium 969, with executable instructions stored thereon, may be an example embodiment of a computer-program product that may or may not be fabricated in large quantities to enable distribution of those executable instructions.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to one or both of the network interfaces 590 or 790) may employ any of a variety of communications technologies corresponding to any of a variety of communications technologies that may be employed to communicatively couple a computing device to one or more other devices. Again, one or both of various forms of wired or wireless communications may be employed to enable the processor component 950 to interact with input/output devices (e.g., the depicted example keyboard 920 or printer 925) and/or other computing devices, where such interaction may be through a network (e.g., the network 999) or an interconnected set of networks. In recognition of the often greatly different character of multiple types of timings and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data provided by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 780), such a computing device implementing the processing architecture 3000 may also include the display interface 985. Although more generalized types of interface may be employed in communicatively coupling to a display (whether of the touch screen variety, or not), the somewhat specialized additional processing often required in visually displaying various forms of content on a display, as well as the somewhat specialized nature of the cabling-based interfaces used, often makes the provision of a distinct display interface desirable. Wired and/or wireless communications technologies that may be employed by the display interface 985 in a communicative coupling of the touch screen 980 may make use of timings and/or protocols that conform to any of a variety of industry standards, including without limitation, any of a variety of analog video interfaces, Digital Video Interface (DVI), DisplayPort, etc.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server, which can deliver statistical modeling and machine learning capabilities in a highly interactive programming environment that enables multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising:
  a processor component;
  a task selector for execution by the processor component to receive an indication of a specified task to be performed, wherein the specified task comprises a first set of one or more subtasks;
  a source selector for execution by the processor component to receive an indication of a specified source device to perform at least the first set of one or more subtasks, and to retrieve from the specified source device an indication of a source processing environment currently available within at least the specified source device in response to the receipt of the indication of the specified source device, wherein:
the source device stores a source data set to serve as an input to performing the specified task; and
the indication of the source processing environment comprises indications of an identity and version level of a database routine of the specified source device; and an instruction generator for execution by the processor component to determine a first set of one or more languages able to be interpreted by the database routine of the specified source device based on the identity and version level of the database routine of the specified source device, select a language of the first set of languages in which to generate instructions for each subtask of the first set of subtasks based on at least one aspect of the source processing environment, generate the instructions to perform each subtask of the first set of subtasks, and transmit first task instructions comprising the instructions generated to perform each subtask of the first set of subtasks to the specified source device.

2. The apparatus of claim 1, comprising:
a user interface (UI) component for execution by the processor component to generate, by circuitry for presentation on a display, a selection of tasks, a selection of source data sets and a selection of portions of the source data set, wherein:
the selection of tasks comprises the specified task;
the selection of source data sets comprises the source data set; and
the source selector is to receive an indication of selection of the source data set from the selection of source data sets; and
a portion selector for execution by the processor component to retrieve from the specified source device an indication of organization of data within the source data set in response to the selection of the source data set, and to receive an indication of selection of at least one portion of the source data set, wherein the instruction generator is to generate the instructions to perform a subtask of the first set of one or more subtasks to employ the selected at least one portion of the source data set as an input to the performance of the specified task.

3. The apparatus of claim 1, the instruction generator to determine the first set of languages based additionally on an identity and version level of an add-on routine that augments the first set of languages able to be interpreted by the database routine of the specified source device.

4. The apparatus of claim 1, the source processing environment comprising a first quantity of threads of execution supported by a processor component of the specified source device and available to execute the first task instructions, and the instruction generator to, for at least one subtask of the first set of subtasks, select the language in which to generate instructions to perform the at least one subtask based at least partly on the first quantity of threads.

5. The apparatus of claim 1, the source processing environment comprising processor components of an available quantity of interconnected source devices that comprises the source device, and the instruction generator to, for at least one subtask of the first set of subtasks, select the language in which to generate instructions to perform the at least one subtask based at least partly on the available quantity of interconnected source devices.

6. The apparatus of claim 1, the source processing environment comprising a type of storage device that enables use of a language of the first set of languages to speed performance of a subtask, and the instruction generator to, for at least one subtask of the first set of subtasks, select the language in which to generate instructions to perform the at least one subtask based at least partly on availability of the type of storage device, wherein:
the type of storage device comprises at least one of random access memory (RAM), cache memory or a redundant array of storage components.

7. The apparatus of claim 1, comprising a destination selector for execution by the processor component to receive an indication of a specified destination device to perform at least a second set of one or more subtasks, and to retrieve from the specified destination device an indication of a destination processing environment currently available within at least the specified destination device in response to receiving the indication of the specified destination device, wherein:
the specified task comprises the second set of one or more subtasks;
the destination device is to store data generated by performing the specified task; and
the indication of the destination processing environment comprises indications of an identity and version level of a database routine of the specified destination device; and
the instruction generator is to determine a second set of one or more languages able to be interpreted by the database routine of the specified destination device based on the identity and version level of the database routine of the specified destination device, select a language of the second set of languages in which to generate instructions for each subtask of the second set of subtasks based on at least one aspect of the destination processing environment, generate the instructions to perform each subtask of the second set of subtasks, and transmit second task instructions comprising the instructions generated to perform each subtask of the second set of subtasks to the specified destination device.

8. The apparatus of claim 7,
a user interface (UI) component for execution by the processor component to generate, by circuitry for presentation on a display, a selection of destination data sets;
the destination selector to receive an indication of selection of a destination data set in which to store data generated by performance of the specified task from the selection of destination data sets;
a portion selector for execution by the processor component to retrieve from the specified destination device an indication of organization of data within the destination data set in response to the selection of the destination data set; and
the instruction generator to generate the instructions to perform a subtask of the second set of one or more subtasks to store the data in the destination data set.

9. The apparatus of claim 7, the instruction generator to determine the second set of languages based additionally on an identity and version level of an add-on routine that augments the second set of languages able to be interpreted by the database routine of the specified destination device.

10. The apparatus of claim 7, wherein the first set of languages differs from the second set of languages.

11. A computer-program product tangibly embodied in a non-transitory machine-readable storage medium, the computer-program product including instructions operable to cause a computing device to perform operations including:
receive an indication of a specified task to be performed, wherein the specified task comprises a first set of one or more subtasks;
receive an indication of a specified source device to perform at least the first set of one or more subtasks, wherein the source device stores a source data set to serve as an input to performance of the specified task;
retrieve from the specified source device an indication of a source processing environment currently available within at least the specified source device in response to the receipt of the indication of the specified source device, wherein the indication of the source processing environment comprises indications of an identity and version level of a database routine of the specified source device;
determine a first set of one or more languages able to be interpreted by the database routine of the specified source device based on the identity and version level of the database routine of the specified source device;
for each subtask of the first set of subtasks, select a language of the first set of languages in which to generate instructions to perform the subtask based on at least one aspect of the source processing environment;
generate the instructions to perform each subtask of the first set of subtasks; and
transmit first task instructions comprising the instructions generated to perform each subtask of the first set of subtasks to the specified source device.

12. The computer-program product of claim 11, the computing device caused to perform operations including:
generate for presentation on a display a selection of tasks, wherein the selection of tasks comprises the specified task;
generate for presentation on the display a selection of source data sets in response to the receipt of the indication of the specified task, wherein the selection of source data sets comprises the source data set;
receive an indication of selection of the source data set from the selection of source data sets;
retrieve from the specified source device an indication of organization of data within the source data set in response to the selection of the source data set;
generate for presentation on the display a selection of portions of the source data set;
receive an indication of selection of at least one portion of the source data set; and
generate the instructions to perform a subtask of the first set of one or more subtasks to employ the selected at least one portion of the source data set as an input to the performance of the specified task.

13. The computer-program product of claim 11, the computing device caused to perform operations including, determine the first set of languages based additionally on an identity and version level of an add-on routine that augments the first set of languages able to be interpreted by the database routine of the specified source device.

14. The computer-program product of claim 11, the computing device caused to perform operations including:
employ the identity and version level of at least the database routine of the specified source device to retrieve indications of relative preference ratings for each language of the first set of languages from an instructions database; and
determine a default selection of a language from among the first set of languages in which to generate the instructions to perform each subtask of the first set of subtasks based on the relative preference ratings.

15. The computer-program product of claim 14, the computing device caused to perform operations including employ the identity and version level of an add-on routine that augments the first set of languages able to be interpreted by the database routine of the specified source device with a further language to retrieve an indication of a relative preference rating for the further language from the instructions database prior to determining the default selection of a language.

16. The computer-program product of claim 14, the computing device caused to perform operations for each subtask of the first set of subtasks, including:
determine whether a set of conditions specified in the instructions database are met to override the default selection of a language for the subtask with an alternate selection of a language from among the first set of languages;
in response to the conditions being met, compare a relative preference rating of the alternate selection of a language to the relative preference rating of the default selection of a language; and
select one of the default selection of a language and the alternate selection of a language in which to generate instructions to perform the subtask based on the comparison.

17. The computer-program product of claim 11, the computing device caused to perform operations including:
receive an indication of a specified destination device to perform at least a second set of one or more subtasks, wherein the specified task comprises the second set of one or more subtasks and the destination device is to store data generated by performance of the specified task;
retrieve from the specified destination device an indication of a destination processing environment currently available within at least the specified destination device in response to the receipt of the indication of the specified destination device, wherein the indication of the destination processing environment comprises indications of the identity and version level of a database routine of the specified destination device;
determine a second set of one or more languages able to be interpreted by the database routine of the specified destination device based on the identity and a version level of the database routine of the specified destination device;
for each subtask of the second set of subtasks, select a language of the second set of languages in which to generate instructions to perform the subtask based on the destination processing environment;
generate the instructions to perform each subtask of the second set of subtasks; and
transmit second task instructions comprising the instructions generated to perform each subtask of the second set of subtasks to the specified destination device.

18. The computer-program product of claim 17, the computing device caused to perform operations including:
generate for presentation on a display a selection of destination data sets in response to the receipt of the indication of the specified task;

receive an indication of selection of a destination data set in which to store data generated by performance of the specified task from the selection of destination data sets;

retrieve from the specified destination device an indication of organization of data within the destination data set in response to the selection of the destination data set; and generate the instructions to perform a subtask of the second set of one or more subtasks to store the data in the destination data set.

19. The computer-program product of claim 17, the computing device caused to perform operations including, determine the second set of languages based additionally on an identity and a version level of an add-on routine that augments the second set of languages able to be interpreted by the database routine of the specified destination device.

20. The computer-program product of claim 17, wherein the first set of languages differs from the second set of languages.

21. A computer-implemented method comprising:

receiving, at a coordinating device, an indication of a specified task to be performed, wherein the specified task comprises a first set of one or more subtasks;

receiving, at the coordinating device, an indication of a specified source device to perform at least the first set of one or more subtasks, wherein the source device stores a source data set to serve as an input to performing the specified task;

retrieving from the specified source device an indication of a source processing environment currently available within at least the specified source device in response to receiving the indication of the specified source device, wherein the indication of the source processing environment comprises indications of an identity and version level of a database routine of the specified source device;

determining a first set of one or more languages able to be interpreted by the database routine of the specified source device based on the identity and version level of the database routine of the specified source device;

for each subtask of the first set of subtasks, selecting a language of the first set of languages in which to generate instructions to perform the subtask based on at least one aspect of the source processing environment;

generating the instructions to perform each subtask of the first set of subtasks; and transmitting first task instructions comprising the instructions generated to perform each subtask of the first set of subtasks to the specified source device.

22. The computer-implemented method of claim 21, comprising:

generating, by circuitry for presentation on a display, a selection of tasks, wherein the selection of tasks comprises the specified task;

generating, by circuitry for presentation on the display, a selection of source data sets in response to receiving the indication of the specified task, wherein the selection of source data sets comprises the source data set;

receiving, at the coordinating device, an indication of selection of the source data set from the selection of source data sets;

retrieving from the specified source device an indication of organization of data within the source data set in response to the selection of the source data set;

generating, by circuitry for presentation on the display, a selection of portions of the source data set;

receiving, at the coordinating device, an indication of selection of at least one portion of the source data set; and generating the instructions to perform a subtask of the first set of one or more subtasks to employ the selected at least one portion of the source data set as an input to the performance of the specified task.

23. The computer-implemented method of claim 21, comprising determining the first set of languages based additionally on an identity and version level of an add-on routine that augments the first set of languages able to be interpreted by the database routine of the specified source device.

24. The computer-implemented method of claim 21, comprising:

employing the identity and version level of at least the database routine of the specified source device to retrieve indications of relative preference ratings for each language of the first set of languages from an instructions database; and determining a default selection of a language from among the first set of languages in which to generate the instructions to perform each subtask of the first set of subtasks based on the relative preference ratings.

25. The computer-implemented method of claim 24, comprising employing the identity and version level of an add-on routine that augments the first set of languages able to be interpreted by the database routine of the specified source device with a further language to retrieve an indication of a relative preference rating for the further language from the instructions database prior to determining the default selection of a language.

26. The computer-implemented method of claim 24, the comprising for each subtask of the first set of subtasks:

determining whether a set of conditions specified in the instructions database are met to override the default selection of a language for the subtask with an alternate selection of a language from among the first set of languages;

in response to the conditions being met, comparing a relative preference rating of the alternate selection of a language to the relative preference rating of the default selection of a language; and selecting one of the default selection of a language and the alternate selection of a language in which to generate instructions to perform the subtask based on the comparison.

27. The computer-implemented method of claim 21, comprising:

receiving, at the coordinating device, an indication of a specified destination device to perform at least a second set of one or more subtasks, wherein the specified task comprises the second set of one or more subtasks and the destination device is to store data generated by performing the specified task;

retrieving from the specified destination device an indication of a destination processing environment currently available within at least the specified destination device in response to receiving the indication of the specified destination device, wherein the indication of the destination processing environment comprises indications of an identity and version level of a database routine of the specified destination device;

determining a second set of one or more languages able to be interpreted by the database routine of the specified destination device based on the identity and version level of the database routine of the specified destination device;

for each subtask of the second set of subtasks, selecting a language of the second set of languages in which to generate instructions to perform the subtask based on the destination processing environment;

generating the instructions to perform each subtask of the second set of subtasks; and transmitting second task instructions comprising the instructions generated to perform each subtask of the second set of subtasks to the specified destination device.

28. The computer-implemented method of claim 27, comprising:

generating, by circuitry for presentation on a display, a selection of destination data sets in response to receiving the indication of the specified task;

receiving, at the coordinating device, an indication of selection of a destination data set in which to store data generated by performance of the specified task from the selection of destination data sets;

retrieving from the specified destination device an indication of organization of data within the destination data set in response to the selection of the destination data set; and generating the instructions to perform a subtask of the second set of one or more subtasks to store the data in the destination data set.

29. The computer-implemented method of claim 27, the method comprising determining the second set of languages based additionally on an identity and a version level of an add-on routine that augments the second set of languages able to be interpreted by the database routine of the specified destination device.

30. The computer-implemented method of claim 27, the specified task comprising a third set of one or more subtasks, the method comprising:

comparing the source processing environment to the destination processing environment;

selecting one of the specified source device and the specified destination device to perform the third set of one or more subtasks based on the comparison;

generating instructions to perform each subtask of the third set of one or more subtasks; and transmitting the instructions generated to perform each subtask of the third set of one or more subtasks to the selected one of the specified source device and the specified destination device.

* * * * *